US011423072B1

(12) United States Patent
Chen et al.

(10) Patent No.: US 11,423,072 B1
(45) Date of Patent: Aug. 23, 2022

(54) ARTIFICIAL INTELLIGENCE SYSTEM EMPLOYING MULTIMODAL LEARNING FOR ANALYZING ENTITY RECORD RELATIONSHIPS

(71) Applicant: Amazon Technologies, Inc., Seattle, WA (US)

(72) Inventors: Xianshun Chen, Seattle, WA (US); Lichao Wang, Seattle, WA (US); Archiman Dutta, Shoreline, WA (US)

(73) Assignee: Amazon Technologies, Inc., Seattle, WA (US)

( * ) Notice: Subject to any disclaimer, the term of this patent is extended or adjusted under 35 U.S.C. 154(b) by 200 days.

(21) Appl. No.: 16/945,572

(22) Filed: Jul. 31, 2020

(51) Int. Cl.
*G06F 16/35* (2019.01)
*G06F 16/51* (2019.01)
*G06K 9/62* (2022.01)
*G06N 20/00* (2019.01)
*G06Q 10/10* (2012.01)

(52) U.S. Cl.
CPC .............. *G06F 16/35* (2019.01); *G06F 16/51* (2019.01); *G06K 9/6215* (2013.01); *G06N 20/00* (2019.01); *G06Q 10/10* (2013.01)

(58) Field of Classification Search
CPC ....... G06F 16/35; G06F 16/51; G06K 9/6215; G06N 20/00; G06Q 10/10
See application file for complete search history.

(56) References Cited

U.S. PATENT DOCUMENTS

| | | |
|---|---|---|
| 6,169,969 B1 | 1/2001 | Cohen |
| 6,327,561 B1 | 12/2001 | Smith et al. |
| 6,363,381 B1 | 3/2002 | Lee et al. |
| 6,697,998 B1 | 2/2004 | Damerau et al. |
| 7,644,102 B2 | 1/2010 | Gaussier et al. |
| 7,644,127 B2 | 1/2010 | Yu |
| 7,912,705 B2 | 3/2011 | Wasson et al. |
| 8,140,491 B2 | 3/2012 | Mandagere et al. |
| 8,200,640 B2 | 6/2012 | Arasu et al. |
| 8,321,648 B2 | 11/2012 | Condict |
| 8,407,164 B2 | 3/2013 | Malik et al. |
| 8,977,622 B1 | 3/2015 | Dutta |
| 9,830,344 B2 | 11/2017 | Dutta |
| 10,217,080 B1 | 2/2019 | Dutta |
| 10,303,797 B1 | 5/2019 | Menezes et al. |
| 10,339,470 B1 | 7/2019 | Dutta et al. |
| 10,565,498 B1 | 2/2020 | Zhiyanov |

(Continued)

OTHER PUBLICATIONS

Yuting Song et al, "Metadata Similarity Calculation in Cross-Language Record Linkage based on Cross-Lingual Embedding Models", dated 2019, pp. 1-7.

(Continued)

*Primary Examiner* — Asghar H Bilgrami
(74) *Attorney, Agent, or Firm* — Robert C. Kowert; Kowert, Hood, Munyon, Rankin & Goetzel, P.C.

(57) ABSTRACT

Respective text feature sets and non-text feature sets are generated corresponding to individual pairs of a plurality of record pairs. At least one text feature is based on whether a text token exists in both records of a pair. Perceptual hash values are used for non-text feature sets. A machine learning model is trained, using the text and non-text feature sets, to generate relationship scores for record pairs. The model includes a text sub-model and a non-text sub-model.

20 Claims, 12 Drawing Sheets

(56) References Cited

U.S. PATENT DOCUMENTS

| | | | |
|---|---|---|---|
| 2007/0239745 A1 | 10/2007 | Guerraz et al. | |
| 2009/0037440 A1 | 2/2009 | Will et al. | |
| 2018/0150724 A1 | 5/2018 | Brock | |
| 2019/0129952 A1* | 5/2019 | Yoshida | G06F 16/24578 |
| 2020/0285737 A1* | 9/2020 | Kraus | G06F 21/554 |
| 2020/0334093 A1* | 10/2020 | Dubey | G06F 11/0778 |

OTHER PUBLICATIONS

William W. Cohen et al, "A Comparison of String Metrics for Matching Names and Records", dated 2003, pp. 1-6.
Yichao Lu et al, "A neural interlingua for multilingual machine translation", dated Oct. 16, 2018, pp. 1-9.
Ivan P. Fellegi et al, "A Theory for Record Linkage", dated Dec. 1969, vol. 64, No. 328, pp. 1183-1210.
Xiaonan Zhao et al, "A weakly supervised adaptive triplet loss for deep metric learning", pp. 1-4.
Ashish Vaswani et al, "Attention Is All You Need", dated 2017, 31st Conference on Neural Information Processing Systems, pp. 1-11.
Yoon Kim, "Character-Aware Neural Language Models", dated 2016, pp. 1-9.
Oyku Ozlem Cakal et al,"CLRL: Feature Engineering for Cross-Language Record Linkage", dated 2019, pp. 1-4.
Yoon Kim "Convolutional Neural Networks for Sentence Classification", dated Sep. 2014, pp. 1-6.
Yuting Song et al, "Cross-Language Record Linkage based on Semantic Matching of Metadata", dated Mar. 2019, DBSJ Journal vol. 17 No. 1, pp. 1-8.
Sidharth Mudgal et al, "Deep Learning for Entity Matching: A Design Space Exploration", dated Jun. 10-15, 2018, pp. 1-16.
Ahmed K. Elmagamid et al, "Duplicate Record Detection: A Survey", dated Jan. 2007, IEEE Transactions on knowledge and data engineering, vol. 19, No. 1, pp. 1-16.
Wang Ling et al, "Finding Function in Form: Compositional Character Models for Open Vocabulary Word Representation", dated May 23, 2016, pp. 1-11.
Melvin Johnson et al, "Google's Multilingual Neural Machine Translation System: Enabling Zero-Shot Translation", vol. 5. pp. 339-351, dated 2017.
Vincenzo Di Cicco et al, "Interpreting Deep Learning Models for Entity Resolution: An Experience Report Using Lime", dated Jul. 5, 2019, pp. 1-4.
Holger Schwenk et al, "Learning Joint Multilingual Sentence Representations with Neural Machine Translation", dated Aug. 8, 2017, pp. 1-11.
Arijit Biswas et al, "MRNet-Product2Vec: A Multi-Task Recurrent Neural Network for product Embeddings", dated Sep. 21, 2017, pp. 1-5.
Orhan Firat et al, "Multi-Way, Multilingual Neural Machine Translation with a Shared Attention Mechanism", dated Jan. 6, 2016, pp. 1-10.
Adam Paszke et al, "PyTorch: An Imperative Style, High-Performance Deep Learning Library", 33rd Conference on Neural Information processing system, pp. 1-12.
Halbert L. Dunn et al, "Record Linkage", Dated May 10, 1946, pp. 1-5.
Adelene Y.I. Sim et al., "Record2Vec: Unsupervised Representation Learning for Structured Records", pp. 1-6.
Nils Reimers et al, "Sentence-BERT: Sentence Ebeddings using Siamese BERT-Networks", dated Aug. 27, 2019, pp. 1-11.
Hanna Kopcke et al, "Tailoring entity resolution for matching product offers", dated Mar. 26-30, 2012, pp. 1-12.
Sebastian Klenk et al, "The Normalized Compression Distance as a Distance Measure in Entity Identification", dated Apr. 8, 2010, pp. 1-17.
Edourd Grave et al, "Unsupervised Alignment of Embeddings with Wassertein Procrustes", dated May 29, 2018, pp. 1-11.
Jane Bromley, et al., "Signature Verification using a "Siamese" Time Delay Neural Network", AT&T Bell Laboratories, 1994, pp. 737-744.
Oriol Vinyals, et al., "Matching Networks for One Shot Learning", In Advances in Neural Information Processing Systems, 2016, pp. 1-12.
Jordan Burgess, et al., "One-Shot Learning in Discriminative Neural Networks", Workshop on Bayesian Deep Learning, NIPS 2016, pp. 1-3.
Anonymous, "Classification—TensorFlow", Retrieved from URL: https://www.tensorflow.org/versions/r0.10/api_docs/python/nn/classification#sigmoid_cross_entropy_with_logits on Feb. 15, 2017, pp. 1-5.
Wikipedia, "Keras", Retrieved from URL: https://en.wikipedia.org/wiki/Keras on Feb. 15, 2017, pp. 1-2.
Amazon Web Services, "Amazon Machine Learning—Developer Guide Version Latest", Updated Aug. 2, 2016, pp. 1-146.
Gregory Koch, et al., "Siamese Neural Networks for One-shot Image Recognition", In Proceeding of the 32nd International Conference on Machine Learning, JMLR: W &CP vol. 37, 2015, pp. 1-8.
Colah's Blog, "Understanding LSTM Networks", Posted on Aug. 27, 2015, pp. 1-22.
Sergei Dobroshinksy et al, "Integrate and deduplicate datasets using AWS Lake Formation FindMatches", AWS Big Data Blog, Retrieved from https://aws.amazon.com/blogs/big-data/integrate-and-deduplicate-datasets-using-aws-lake-formation-findmatches/, Feb. 5, 2020, pp. 1-24.
Russell Reas et al, "SuperPart: Supervised graph partitioning for record linkage", The 44th International Conference an the Very Large Data Bases, Proceedings of the VLDB Endowment, vol. 11, No. 5, Aug. 2018, pp. 1-10.
Hossein Esfandiari et al, "Parallel and Streaming Algorithms for K-Core Decomposition", dated Nov. 23, 2018, pp. 1-13.
Unknown "Graphstream—The Connected Components Algorithm", pp. 1-4.
Unknown "Kruskal's Algorithm", pp. 1-8.
Wissam Khaouid et al., "K-Core Decomposition of Large Networks on a Single PC", Proceedings of the VLDB Endowment, vol. 9, No. 1, dated 2015, pp. 1-11.
Unknown "Single-Linkage Clustering", pp. 1-6.
Wikipedia "Minimum Spanning Tree", pp. 1-15.
Szegedy et al., "Going deeper with convolutions", Sep. 17, 2014, accessed from https://arxiv.org/abs/1409.4842.
Garcia-Gasulla et al., "A Visual Embedding for the Unsupervised Extraction of Abstract Semantics", Dec. 19, 2016, arXiv:1507 08818v6.
He et al., "Deep Residual Learning for Image Recognition", Microsoft Research, Dec. 10, 2015, arXiv:1512.03385v1.
Szegedy et al., "Inception-v4, Inception-ResNet and the Impact of Residual Connections on Learning", Google Inc., Aug. 23, 2016, arVix:1602.07261v2.
Mikolov et al., "Distributed Representations of Words and Phrases and their Compositionality", Oct. 16, 2013, arXiv:1310.4546v1.
Zhang et al., "Character-level Convolutional Networks for Text Classification", Courant Institute of Mathematical Sciences, New York University, Apr. 4, 2016, arXiv:1509.01626v3.
Wikipedia, "fastText", accessed Jul. 27, 2020, from https://en.wikipedia.org/wiki/FastText.
Github, "Wiki2Vec". accessed Jul. 27, 2020, from https://github.com/idio/wiki2vec.
U.S. Appl. No. 16/902,055, filed Jun. 15, 2020, entitled "Artificial Intelligence System for Translation-Less Similarity Analysis in Multi-Language Context", by Inventor Karim Bouyarmane.
U.S. Appl. No. 16/900,620, filed Jun. 12, 2020, titled "Artificial Intelligence System Using Unsupervised Transfer Learning for Intra-Cluster Analysis", by Inventors Xianshun Chen et al.
U.S. Appl. No. 16/817,218, filed Mar. 12, 2020, titled "Artificial Intelligence System With Unsupervised Model Training for Entity-Pair Relationship Analysis", by Inventors Dmitry Vladimir Zhiyanov et al.
U.S. Appl. No. 16/808,162, filed Mar. 3, 2020, titled "Scalable Hierarchical Clustering", by Inventors Xianshun Chen et al.

(56) References Cited

OTHER PUBLICATIONS

Gal et al., "A Theoretically Grounded Application of Dropout in Recurrent Neural Networks", Oct. 5, 2016, arXiv:1512.05287v5.
George Papadakis, Jonathan Svirsky, Avigdor Gal, and Themis Palpanas. Comparative analysis of approximate bocking techniques for entity resolution. Proc VLDB Endow., 9(9):684 695, 2016.
U.S. Appl. No. 16/455,601, filed Jun. 27, 2019, titled "Machine Learned System for Predicting Item Package Quantity Relationship Between Item Descriptions", by Inventors Lichao Wang et al.
U.S. Appl. No. 16/824,480, filed Mar. 29, 2020, titled "Artificial Intelligence System Providing Automated Distributed Training of Machine Learning Models", by Inventors Xianshun Chen et al.
Wei Zhang et al, "AutoBlock: A Hands-off Blocking Framework for Entity Matching", dated Feb. 3-7, 2020, pp. 1-9.

\* cited by examiner

Source entity record    201

| Item name | Company-A HappyBaby Stroller LMN 3032 Great For Kids Under 3 |
|---|---|
| Brand | |
| Model | |
| Weight | 16 lbs 13oz |
| Color | Green |
| UPC | |

...

Target entity record    251

| Item name | Company-A HappyBaby Red |
|---|---|
| Brand | Company-A |
| Model | LMN3032 |
| Weight | 16.8 pounds |
| Color | |
| UPC | 572143213241 |

ARTIFICIAL INTELLIGENCE SYSTEM EMPLOYING MULTIMODAL LEARNING FOR ANALYZING ENTITY RECORD RELATIONSHIPS

BACKGROUND

Records for many kinds of large-scale business applications are often stored in electronic form. For example, a global store may use electronic records containing text as well as non-text attributes to store information about millions of items that are available for sale, and publish at least some portions of the item descriptions contained in the electronic records to enable customers to select and purchase the items. Similarly, a large medical organization may store medical records for millions of customers. Although some organizations may attempt to standardize the manner in which information about entities is stored internally, such standardized approaches may not always succeed. For example, in environments in which a variety of vendors or product suppliers sell their items through a common re-seller, different vendors may use respective approaches towards describing items. Furthermore, the standardization approaches may differ from one organization to another, which may for example make it somewhat difficult to determine whether an item description at one store web site is necessarily referring to the same item as another differently-formatted item description at another web site.

The ability to resolve entity information-related ambiguities (such as slightly different descriptions of the same entities, or very similar descriptions of distinct entities) may be extremely important for many organizations. For example, consider a scenario in which the same product is being sold on behalf of several different product suppliers via a particular store web-site, at which for each available product, a "details" web page is made available to potential customer. If different details pages are provided, based on the differences in the way that the product suppliers describe their product, this may lead to customer confusion, lowered customer satisfaction or even lower sales than may have been achieved had the products been clearly and unambiguously identified as being identical. Resolving such ambiguities, given various natural-language descriptions and/or non-text information about items originating at different sources, may present a non-trivial technical challenge, especially in environments in which the item catalog or inventory size is extremely large and tends to change rapidly.

BRIEF DESCRIPTION OF DRAWINGS

FIG. 2 illustrates examples of text attribute values of a pair of entity records for which similarity analysis may be performed, according to at least some embodiments.

Figure 1:
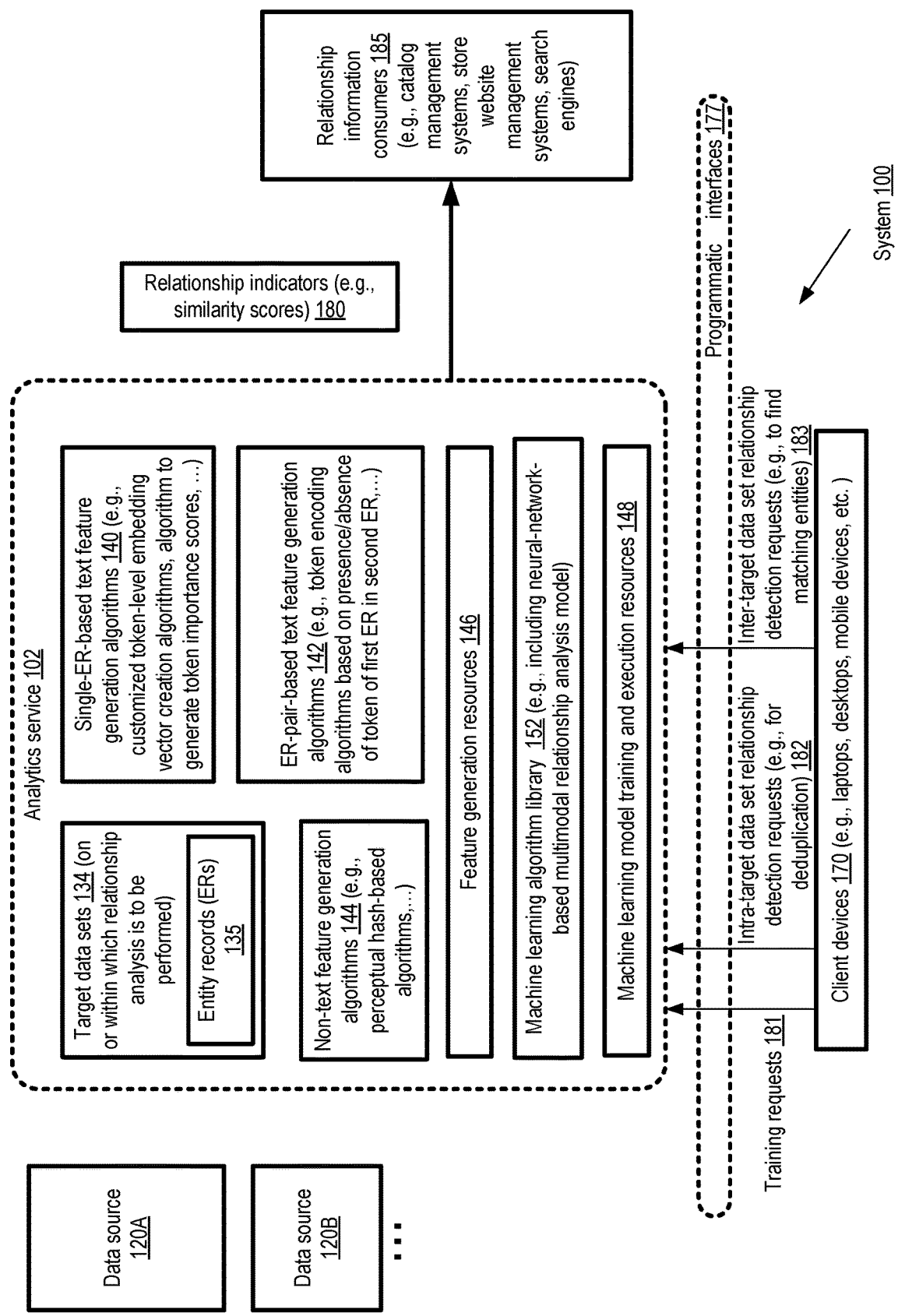
FIG. 1 illustrates an example system environment in which multi-modal learning techniques that combine analysis of text and non-text attributes may be used to detect similarity and other relationships between entity records, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for detecting logical relationships such as similarity between pairs of entity records using features derived from multiple types of entity record content, including for example text attributes as well as images and other non-text attributes. Such record relationship analysis may be performed, for example, to detect the presence of duplicates within catalogs of large electronic or physical stores, to correct errors within large record stores, to improve the organization of web sites which provide information about entities represented by the entity records, to help in clustering/classifying entities, and so on.

A given entity record may typically comprise values of a plurality of attributes, and be intended to represent a distinct real-word entity such as a catalog item, a person, a medical symptom, an organization and the like. In some cases, the entity records which are analyzed to detect relationships may be generated by a variety of sources (e.g., vendors of different sets of items to be included in a catalog), not all of whom may necessarily provide attribute values in a consistent and error-free manner. For example, a given property of an entity (e.g., a color or a size) may be indicated via different attributes by different record sources: some vendors may include the color in the title attribute field of a record, even though a separate color attribute may also be available. As a result, using simple attribute-level text matching techniques alone may be insufficient to detect similarity. Non-text attributes such as images and videos may further complicate analysis of record relationships. For example, a pair of records of a catalog may contain very similar content in their respective text attributes, but may have very different images in their respective image attributes. In another example, one record source may provide a color of an item in a text attribute and not provide an image of the item, while another record source may indicate the color via an image, without mentioning the color in a text attribute. Using text alone, or images alone, may therefore be insufficient to characterize the relationships among the entity records in such scenarios. Entity records which comprise both text and non-text (e.g., image, video or audio) attributes may be referred to as multi-modal entity records herein, and analysis techniques which utilize both text and non-text content of the entity records may be referred to as multi-modal analysis techniques. In some cases, non-text attributes may comprise numeric values arranged in tables, spreadsheets or other formats.

At a high level, the proposed techniques may be summarized as follows. For a given target data set containing records representing entities whose relationships are to be analyzed (e.g., with respect to other entities of the same target data set, or with respect to entities which are not part of the target data set), respective feature sets may be generated for the text attributes of the records and for each of one or more types of non-text attributes. Pairs of entity records may be analyzed together by combining features generated from a given pair and providing the combination as input to a machine learning model designed to detect the extent (if any) of a relationship between the records of each pair. For a given entity record of a pair of entity records, at least some of the text features may be generated based not just on content of that entity record, but also based on the content of the other entity record of the pair. For example, the manner in which a given text token (e.g., the word "coffeepot") of the given entity record is encoded as a feature to be provided as input to a machine learning model for relationship analysis may depend not only on the text token itself (e.g., the letters making up the work "coffeepot") but also on whether that token is also present in one or more attributes of the other entity record of the pair (and if it is present, the encoding may also be dependent on the specific combinations of attributes in which it is present). A multi-layer text-analysis sub-model may be included in the machine learning model, with one layer dedicated to token-level analysis, and another layer dedicated to attribute level analysis. A wide variety of token-level features may be generated and analyzed in combination (e.g., using a sophisticated neural network which includes incorporates aspects of inception modules, residual networks and the like) to generate text attribute-level features in at least some embodiments.

With respect to non-text attributes, such as an image attribute, at least some features which are based on differences in hash representations (e.g., results of perceptual hash or phash algorithms) of corresponding non-text attributes of the two records of a pair may be generated. Respective vector or tensor encodings of the text portions of the two records (learned in the text-analysis sub-model) may be combined with vector or tensor encodings of non-text portions (learned in a non-text analysis sub-model), and provided as input to a multi-modal relationship score predictor component of the machine learning model. The relationship score (e.g., a similarity score, a dissimilarity score, or an inclusion/membership score indicative of whether one of the records of the pair represents a subset of an entity represented by the other record of the pair) generated by the predictor may be used to initiate one or more actions in various embodiments. For example, if the relationship score is a similarity score and exceeds a threshold, an automated action to merge the two entity records of the pair into a single record may be initiated in some embodiments. By using a combination of features which take subtle signals such as the presence/absence of a given text token in attributes of the other record of a pair of analyzed records into account, and also take the extent of similarity of non-identical text tokens in the two records into account, and by combining text features with non-text features, in various embodiments pairwise records relationships may be detected with higher precision and recall than is feasible with conventional techniques. Potential deficiencies or errors in text attribute contents may be compensated by analyzing non-text attributes, and potential deficiencies or errors in non-text attribute contents may similarly be compensated by analyzing the text attributes. Furthermore, if desired, text-only or non-text-only analysis may be performed in various embodiments, e.g., using a content analysis mode configuration setting or control which can be used to specify the type of content to be used to generate the relationship scores at run-time.

As one skilled in the art will appreciate in light of this disclosure, certain embodiments may be capable of achieving various advantages, including some or all of the following: (a) reducing the amount of computing, storage and other resources that have to be dedicated to detect relationships such as similarities between pairs of entity records of large record sets with high precision and recall, (b) improving the user experience of clients of web sites (including store web sites) which provide end users accesses to large catalogs, e.g., by providing better results for searches and comparisons, and/or (c) improving the user experience of vendors or sellers which wish to have items included within catalogs, e.g., by providing quick feedback about the existence of possible duplicates of their records.

According to some embodiments, a system may comprise one or more computing devices. The computing devices may include instructions that upon execution on or across the one or more computing devices cause the one or more computing devices to obtain a data set comprising a plurality of pairs of entity records. Individual entity records of the pairs may comprise a plurality of attributes including at least a first text attribute and at least a first image attribute in some embodiments. A given text attribute may in turn include one or more text tokens (e.g., words, numbers, or other combinations of characters/symbols). A respective text feature set corresponding to individual pairs of the entity records may be generated. A text feature set corresponding to a given pair of may include separate subsets of features for each of the entity records of the pair: a first-record text feature subset corresponding to the first entity record and a second-record text feature subset corresponding to the second entity record.

Generating the first-record text feature subset in turn may include several steps in at least some embodiments. In one embodiment, the steps may for example include (a) determining whether a first text token of a first text attribute of the first entity record is present within one or more text attributes of the second entity record, (b) generating, based at least in part on in whether the first text token is or is not present in the second entity record, a first pairwise-text-analysis-result feature to represent the first text token within the first-record text feature subset; and (c) generating a second pairwise-text-analysis-result feature to represent the first text token within the first-record text feature subset based at least in part on respective similarity scores (e.g., cosine similarity scores) of a vector representation of the first text token and vector representations of one or more text tokens of the second entity record.

In addition to the text feature set, a respective image feature set may also be generated corresponding to individual pairs the records in various embodiments. An image feature set corresponding to the given pair of entity records may comprise a first-record image feature subset corresponding to the first entity record and a second-record image feature subset corresponding to the second entity record. The first-record image feature subset may be based at least in part on a combination of (a) an embedding of the first image attribute of the first entity record and (b) one or more perceptual hash values corresponding to the first image attribute in some embodiments.

A machine learning model which includes a text sub-model, an image sub-model and a multi-modal similarity score predictor in various embodiments may be trained, using a training data set which includes the text feature sets and the image feature sets, to generate a similarity score for an input pair of entity records in various embodiments. Because the model learns about record contents of multiple types (not just text), the machine learning model may be referred to as a multi-modal model. The text sub-model may include a convolutional sub-network with a plurality of filters including a first filter with a first filter size corresponding to a first number of successive text tokens, and a second filter with a second filter size corresponding to a second number of successive text tokens. The text sub-model may also include a neural sub-network which comprises hierarchically-arranged convolutional layers with one or more skip connections in at least some embodiments. In the image sub-model, one or more computations may be performed on differences between respective image features of entity records of an input pair of entity records. The input of the multi-modal similarity score predictor may comprise learned text representations generated by the text sub-model and learned image representations generated by the image sub-model in at least some embodiments. A similarity score, generated by a trained version of the machine learning model with respect to a particular pair of entity records, may be stored and/or transmitted to one more destinations in various embodiments. In at least one embodiment, the content of at least a portion of a web site, e.g., search results generated in response to a request submitted to a web site, may be modified based on the results produced by the trained version of the model.

According to some embodiments, the relationship analysis may be performed at a network-accessible analytics service of a provider network, e.g., in response to one or more programmatic requests directed to the analytics service by its clients. Clients may utilize the programmatic interfaces supported by the analytics service to specify various preferences pertaining to the analysis, including for example specific text and/or non-text features to be generated for entity record pairs, algorithms to be used to generate one or more features, hyper-parameters of the machine learning model, and so on. The term "provider network" (sometimes simply called a "cloud") refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. The resources of a provider network may in some cases be distributed across multiple data centers, which in turn may be distributed among numerous geographical regions (e.g., with each region corresponding to one or more cities, states or countries). For example, a cloud provider network can be formed as a number of regions, where a region is a geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet or a cellular communication network). A provider network may include numerous network-accessible services, such as a virtualized computing service (VCS), one or more storage services, database services and the like, as well as an analytics service (which may also be referred to as a machine learning service). A VCS may also be referred to as an elastic compute service, virtual machines service, computing cloud service, compute engine, and/or cloud compute in various implementations.

In some embodiments, the entity records for which relationship analysis is performed using the techniques described above may not share a common schema—e.g., or more of the attributes or fields in the schema of one of the records of a pair being analyzed may not be defined the schema of the other record of the pair. As such, the techniques may be applied for relationship analysis among heterogeneous records. In such embodiments. In one embodiment, the multi-modal machine learning model may provide interfaces or configuration parameters which can be used to specify a subset of record attributes to be used at run-time for relationship prediction—e.g., if desired, the model may be executed in text-only mode, in image-only mode, in video-only mode, and so on. Such a parameter may be referred to as a content analysis mode parameter in some embodiments. In text-only mode, only the features generated from text attributes may be used for predicting relationship scores, while non-text features may not be generated or used. Similarly, in image-only mode, only the features generated from image attributes may be used for predicting relationship scores, while non-image attribute features may not be generated or used. In one embodiment, a non-text-only mode may be supported, in which features generated from one or more non-text attributes (which may include images, video, audio, numeric data, etc.) may be used, and text attributes may not be used. A text-only mode may be used, for example, for a pair of entity records for which the requester of the relationship score is aware that one or more of the non-text attributes of at least one of the records are of poor quality and may therefore not be helpful in predicting the relationship score. Similar reasoning may be used in decisions to use other modes in which only a subset of attributes are used. In response to receiving an indication of the mode (e.g., text-only mode, image-only mode, etc.) via a programmatic interface, in at least some embodiments one or more run-time configuration settings of the trained model may be set so as to disable or ignore results of one or more of the subcomponents of the model, and the relationship score may be obtained after the subcomponents have been disabled.

Example System Environment

FIG. 1 illustrates an example system environment in which multi-modal learning techniques that combine analysis of text and non-text attributes may be used to detect similarity and other relationships between entity records, according to at least some embodiments. As shown, system 100 may comprise resources and artifacts of an analytics service 102, including target data sets 134, several types of feature generation algorithms, a machine learning algorithm library 152, feature generation resources 146, and machine learning model training and execution resources 148 in the depicted embodiment. The feature generation algorithms may include, for example, algorithms which take text content of a single entity record into consideration at a time (and are hence referred to as single-ER-based text feature generation algorithms 140), algorithms which take the text of a pair of entity records into account (and are hence referred to as ER-pair-based text feature generation algorithms 142), as well as non-text feature generation algorithms 144 in the depicted embodiment. Analytics service 102 may be referred to as an artificial intelligence service in some embodiments, and system 100 may be referred to as an artificial intelligence system.

The analytics service 102 may implement one or more programmatic interfaces 177 in the embodiment depicted in FIG. 1, which may be used by clients of the service to submit various types of requests and other messages and receive corresponding responses from the service. The programmatic interfaces may include, for example, one or more web-based consoles, a set of application programming interfaces (APIs), command-line tools, graphical user interfaces and the like in various embodiments. Using the interfaces, requests or messages may be submitted from a variety of client devices 170, such as laptops, desktops, mobile devices and the like. For example, training requests 181 to train one or more machine learning models implementing algorithms of library 152 (such as a neural network-based multimodal machine learning model of the kind introduced above) using a training data set comprising a specified set of labeled ER pairs may be submitted. Target data sets 134 (on or within which relationship analysis is to be performed) may each comprise a plurality of entity records (ERs) 135 in the depicted embodiment, obtained from one or more data sources 120 such as data sources 120A or data source 120B. Each ER may comprise values of one or more attributes, which may include text attributes and non-text attributes such as image, video, audio and the like. The ERs of a given pair of ERs for which relationship analysis is to be conducted (or from which features to be used to train the relationship score generation model) may not necessarily comprise values for the same set of attributes in some embodiments, e.g., because the schemas or defined set of attributes of the two ERS differ and/or because some attribute values may be missing from one or both of the ERs. Data source 120A may, for example, include a first database of records produced by one set of record generators or sources (e.g., vendors from a particular region or country who wish to include entity records representing their products or items in a catalog), while data source 120B may include a different database of records produced by a different set of sources.

Programmatic interfaces 177 may also be used to submit relationship detection requests of several types in the depicted embodiment. For example, intra-target data set relationship detection requests 182 may be submitted to identify duplicates within a given data set, while inter-target data set relationship detection requests 183 may be submitted to identify closely matching ERs across two or more target data sets.

A machine learning model which produces a respective relationship score (e.g., in the case of similarity relationships, a real number in the range 0.0 to 1.0 with 0.0 indicating a negligible level of similarity, and 1.0 indicating a match or perfect similarity) for an input pair of ERs may be trained at resources 148 in the depicted embodiment using features generation resources 146. If the ERs include text features, a multi-stage and multi-level text feature generation technique may be employed in at least some embodiments, in which first single-ER-based text features are generated using algorithms 140, and then ER-pair-based text features are generated (in some cases using the single-ER-based text features) using algorithms 142. Single-ER-based text feature generation algorithms 140 may comprise, for example, token-level embedding vector creation algorithms which have been customized for a specific problem domain such as store catalog management, algorithms which generate token importance/relevance scores for problem domains, and so on. ER-pair-based text feature generation algorithms 142 may include token encoding/transformation algorithms based on the presence or absence of a given token in a first ER of a pair of ERs in the attributes of the second ER of the pair, algorithms which take similarity metrics (such as cosine similarity) between the embedding vectors of tokens of one ER of a pair with embedding vectors of tokens of the other ER of the pair into account, and so on. Token-level text-based features may be combined (e.g., via concatenation) to produce attribute-level text features, and attribute-level text features of several attributes be combined to produce record-level text features. As such, a first-record text feature set and a second-record text feature set may be prepared for the first and second ERs of an ER pair. Non-text feature generation algorithms 144 may, for example, take image embeddings, perceptual hash values generated from images for various color channels, and the like into account in the depicted embodiment as discussed below in further detail.

In at least some embodiments, the machine learning models trained using the text and non-text features may comprise several neural network based sub-components, such as a text sub-model, one or more non-text sub-models and a multi-modal score prediction component which consumes learned representations produced by the text and non-text sub-models. The neural network-based components may include various types of convolutional layers and/or mirrored sub-networks (also referred to as Siamese networks) in some embodiments, which are collectively able to learn about text n-grams of varying sizes, hierarchical text constructs, and so on. Features may be generated in parallel in some embodiments, e.g., for a given pair of ERs or for different ER pairs, using hardware and/or software components of one or more computing devices used as feature generation resources. Machine learning model training and execution resources 148 may also comprise software and/or hardware of one or more computing devices in the depicted embodiment. In some embodiments a given computing device may be used for feature generation, model training and/or model execution.

After the model(s) have been trained, they may be stored at a repository of the analytics service in at least some embodiments and executed as needed. Relationship indicators 180 such as similarity scores generated for respective ER pairs by a trained model may be transmitted via one or more programmatic interfaces to one or more relationship information consumers 185 in the depicted embodiment, such as automated catalog management systems, store website management systems, search engines and the like. In some embodiments, at least a portion of content of a web site may be modified based on the relationship indicators—e.g., the arrangement of item records shown via the web site may be changed, search results may be changed, and so on. The scores may also be provided to client devices 170 from which the relationship analysis was requested in at least some embodiments.

Example Text Attributes

FIG. 2 illustrates examples of text attribute values of a pair of entity records for which similarity analysis may be performed, according to at least some embodiments. The pair comprises a source entity record 201, whose similarity with respect to a target entity record 251 is to be estimated. Each of the entity records represent an item of a store catalog, and the contents of the two records may have been provided by distinct content providers/sources (such as respective vendors or sellers) to the store organization at which the entity records are stored and whose web site may be used to sell the items of the catalog. The entity records may have non-text attributes as well, which are not shown in FIG. 2.

Each record has several text fields or attributes, including an item name field, a brand field, a model field, a weight field, a color field and a UPC (Universal Product Code) field in the depicted example. The providers of the record content may be advised to provide data for all the fields applicable to their items, but they may not be required to do so. Furthermore, they may provide any desired strings and/or numbers (with few or no constraints on the data provided, except, for example, constraints on the maximum length and/or the language used) for at least some of the fields. Some record content providers may put several types of information which could potentially be distributed among other fields into a single field, leaving the other fields blank, or duplicating information among several fields.

Both entity records 201 and 251 represent baby strollers in the depicted example. In the source entity record, the text token sequence "Company-A HappyBaby Stroller LMN 3032 Great For Kids Under 3" has been provided for the item name field, the text token sequence "16 lbs 13 oz" has been provided for the weight field, and the text token "Green" has been provided for the color field, with other text fields left empty. In the target entity record, the text token sequence "Company-A HappyBaby Red" has been provided for the item name field, the text token "Company-A" has also been provided for the brand field, the text token "LMN3032" has been provided for the model field, the text token sequence "16.8 pounds" has been provided for the weight field, and the text token "572142213241" has been provided for the UPC field, with other text fields left empty.

A human may be able to look at the values of the various text attributes of the two entity records and come to the following conclusion: the two records probably refer to differently-colored strollers of the same brand and model, and hence represent distinct real-world entities. However, a conventional machine learning model used for detecting similarities based on text attributes alone (which may for example compute the distance between multi-dimensional embeddings of the tokens of each of the records considered singly) may be challenged in reaching the same conclusion for a number of reasons. The model may be able to detect that the word "green" exists in one record and "red" exists in the other record, but the encodings of these two words learned by the model may not necessarily indicate that these are both examples of the logical construct "color" (especially because the word "red" is not in the color field). In addition, several tokens exist in one of the records but not in the other, so the fact that "red" doesn't exist in one of the records and "green" doesn't exist in the other may not necessarily indicate that these two tokens represent the most import distinguishing features of the two records. The different ways in which the weight is expressed in the two records may also be open to misinterpretation. Different weight-related tokens ("lbs" and "pounds") actually refer to the same unit, so this represents a case where the existence of different words in the records should not lead towards a conclusion that the two entities represent differ from one another.

In contrast to conventional approaches, a multi-modal machine learning model of the kind introduced above may be able to reach conclusions similar to those of a human analyst with relative ease in at least some embodiments. Such a model and the associated feature generators encode the tokens which are present in both records in a different way than the tokens which are present in one record and not the other. It may also take the particular fields of the target entity record in which a given token of the source entity record is present, and utilize a number of other text-based features which are able to capture subtle similarities and subtle differences based on text alone. Furthermore, it may combine learning from text-based features with learning from non-text features such as images, which may help overcome deficiencies such as missing information from both types of fields.

Example Multi-Modal Relationship Analysis Methodology

Figure 3:
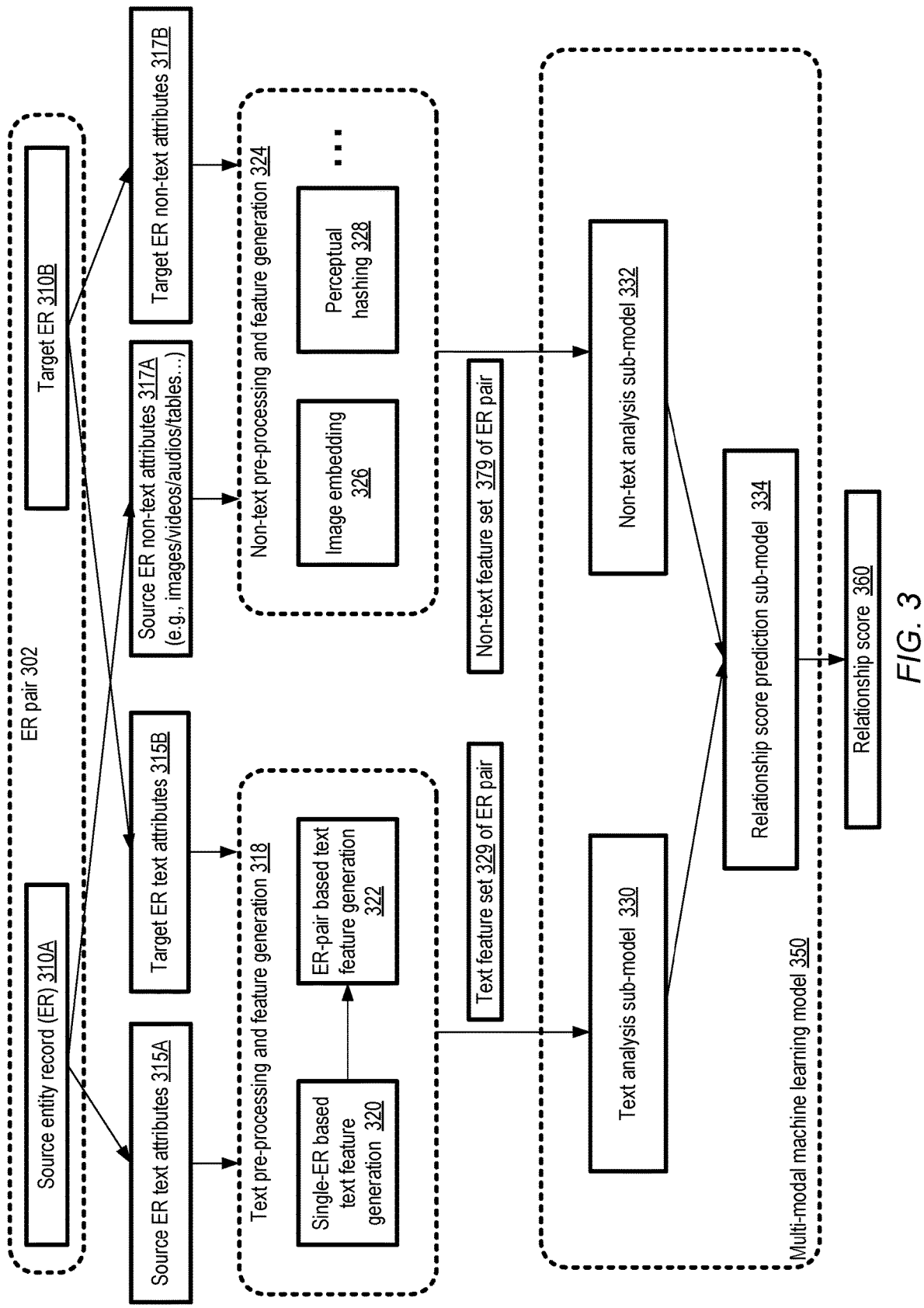
FIG. 3 illustrates an overview of an example multi-modal analysis methodology for record relationship analysis, according to at least some embodiments.

FIG. 3 illustrates an overview of an example multi-modal analysis methodology for record relationship analysis, according to at least some embodiments. The depicted methodology comprises separate feature generation steps for text attributes and non-text attributes of entity records (ERs), after which the generated feature sets for both ERs of a given pair of ERs whose relationship is to be analyzed are passed to a machine learning model. A given entity record pair ER pair 302 comprises source ER 310A and target ER 310B. The source ER 310A comprises one or more text attributes 315A and one or more non-text attributes 317A (e.g., attributes or fields comprising images, videos, audios, numeric values and the like). The target ER 310B comprises one or more text attributes 315B and one or more non-text attributes 317B.

Features based on the text attributes of both ERs may be generated in text pre-processing and feature generation stage 318 of the methodology, while features based on the non-text attributes of both ERs may be generated in a non-text pre-processing and feature generation stage 324 in the depicted embodiment. The text pre-processing and feature generation stage 318 may in turn comprise single-ER based text feature generation 320, followed by ER-pair based text feature generation 322. In at least some embodiments, individual text tokens may first be extracted from the text attributes of each ER of the pair as discussed below in the context of FIG. 4. Token-level features may be generated for individual ones of the tokens, with a first group of token-level features being created for a given token based on examining just a single ER as part of the single-ER based text feature generation 322. Then, a second group of token-level features may be created for the given token being created based on examining the other ER of the ER pair, as part of the ER-pair based text feature generation 322. This second group of token-level features may be referred to as pairwise-text-analysis-result features in at least some embodiments, as they are generated using pairwise analysis of text content of the ERs. The features for all the tokens of a given attribute may be combined and converted to vector form. The vectorized features of each text attribute of a given ER may be combined to produce an ER-level vector representation for each ER. The two ER-level vector representations of the ER pair 302 may be referred to as first-record and second-record text feature subsets with respect to the ER pair in the depicted embodiment. The ER-level vector representations of both ERs of the pair may in turn be combined to form the overall text feature set 329 for the ER pair 302.

The non-text pre-processing and feature generation stage 324 may comprise several different sub-computations in the depicted embodiment, depending for example of the kinds of non-text attributes present in the ER pair 302 and the number of each type of non-text attributes present. In a simple case where each ER comprises just one image, for example, encodings of the images from both ERs 310 may be generated to produce one set of features in computations using selected image embedding technique 326, and some number of perceptual hash values (e.g., one perceptual hash result for a given image for each of several color channels) may be obtained using a selected set of perceptual hash algorithms 328. The features generated from the non-text attributes of the source ER may be combined to form a first-record non-text feature subset, and the features generated from the non-text attributes of the target ER may be combined to form a second-record non-text feature subset. The first-record non-text feature subset and the second-record non-text feature subset may then be combined to form the non-text feature set 379 for the ER pair as a whole.

The text feature set 329 may be provided as input to a text analysis sub-model 330 of multi-modal machine learning model 350, and the non-text feature set 379 may be provided as input to the non-text analysis sub-model 332 in the depicted embodiment. Each sub-model may generate a respective learned representation of its input features, using a variety of techniques (such as various types of convolutional neural network-based techniques for text processing, mirrored neural networks, and the like) as discussed below in further detail. The text analysis sub-model may, for example, comprise a token-level layer and an attribute-level layer, with the attribute-level layer comprising a mirrored or symmetric neural network. The non-text analysis sub-model may also include a mirrored or symmetric neural network in at least some embodiments. The learned representations may then be combined and passed as input to a relationship score prediction sub-model 334 (which may itself comprise a neural network in at least some embodiments). In one embodiment, the relationship score prediction sub-model may comprise a feed-forward neural network. A predicted relationship score 360 for the ER pair 302 may be generated as output by the prediction sub-model 334 in the depicted embodiment.

Example Text Token-Level Features

Figure 4:
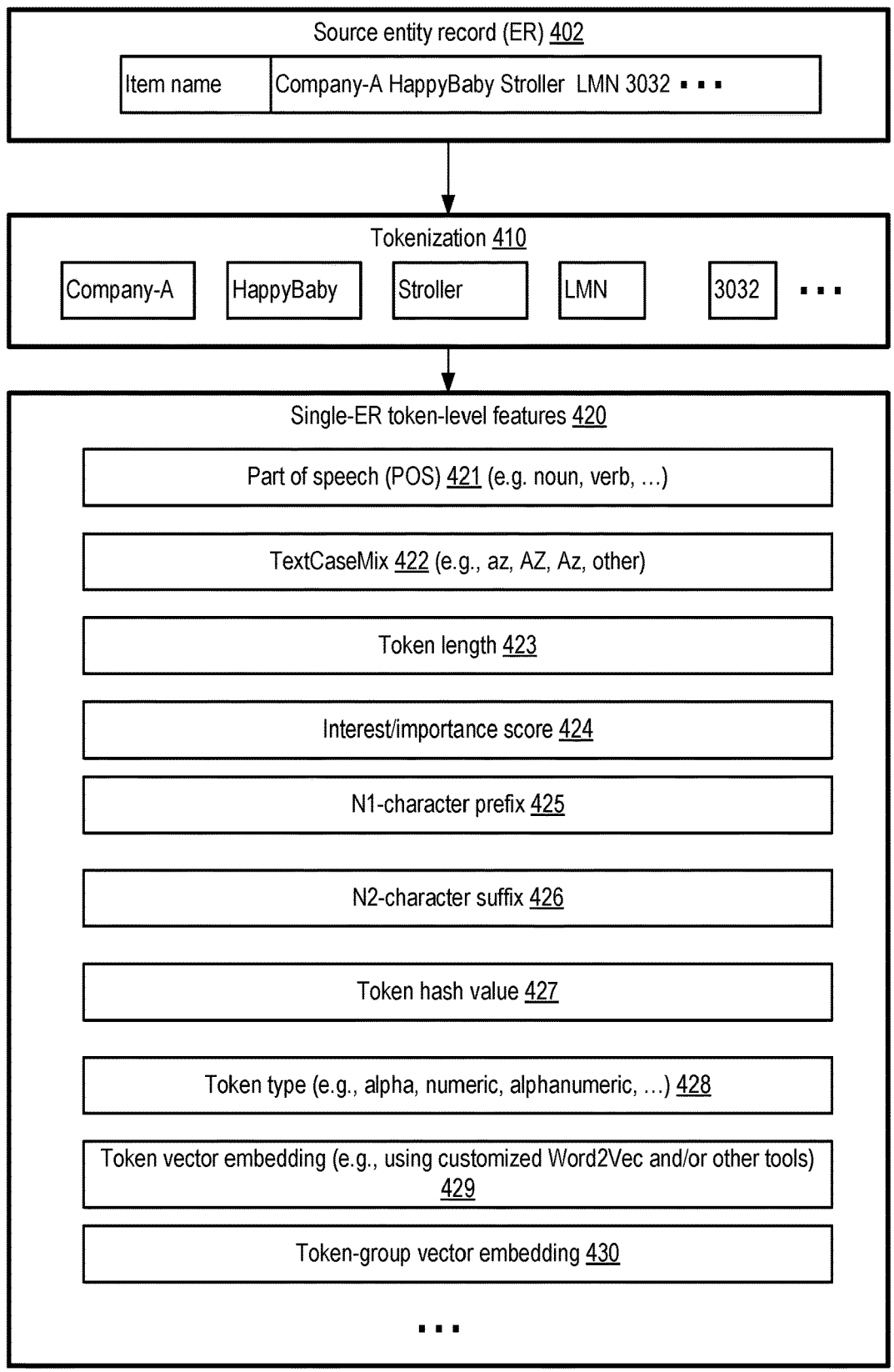
FIG. 4 illustrates example token-level features which may be generated based on text contents of a single entity record of a pair of entity records, according to at least some embodiments.

FIG. 4 illustrates example token-level features which may be generated based on text contents of a single entity record of a pair of entity records, according to at least some embodiments. In the depicted embodiment, an entity record 402 (which could be either a source ER or a target ER of a pair of ERs for which relationship analysis is to be performed) includes a text attribute "Item Name" whose value includes the string "Company-A HappyBaby Stroller LMN 3032". In a tokenization phase 410 of the workflow for generating text-based features from source ER 402, the string value of the Item Name attribute may be subdivided into individual tokens "Company-A", "HappyBaby", "Stroller", etc., e.g., based on detecting token delimiters such as white space within the string.

Then, a set of Single-ER token-level features 420 may be generated for each of the tokens identified from the text attribute value. These features may include, for example, a feature representing the part of speech (POS) 421 of the token, indicating whether the text token represents a noun, a verb, an adjective, etc. The POS may be detected for example by comparing each token with a dictionary entry for the language in which the tokens are expressed, where the dictionary entry indicates the most likely POS for the corresponding token, and/or using a grammatical analysis model in different embodiments. TextCaseMix feature 422 may indicate whether the token consists entirely of lower case text (in which case the feature may be encoded as the string "az"), entirely of all upper case characters (encoded as "AZ"), a mix of upper and lower case (encoded as "Az"), characters representing numbers, etc. The TokenLength feature 424 may be used to indicate the total length (in characters) of each token.

In at least some embodiments, a statistical model or a mapping tool may be used to obtain an indication of a relative importance of various tokens, with respect to their utility as evidence in identifying relationships, within a given problem domain (e.g., store catalog management, human health management, etc.) for which the ERs are being analyzed. A score indicative of the importance of the token may be generated and used as the interest/importance score feature 424 in such embodiments. The importance score may be based, for example, on such factors as how frequently the token occurs in a previously examined corpus of ERs associated with the problem domain; such frequency information may for example indicate how useful the token may be for distinguishing between entities.

Depending on the language in which the text attributes of the entity records are expressed, one or more characters that start words (prefixes) or end words (suffixes) may be useful in distinguishing, or determining semantic similarities, among the tokens representing words. For example, the 4-letter suffix "land" in the words "England" and "Finland" may indicate that the words both refer to countries, while the 3-letter prefix "bio" in words "biochemical" and "biodegradable" may indicate that both words refer to qualities associated with living things. In the depicted embodiment, the token-level features 420 for a given token may include an N1-character prefix 425, as well as an N2-character suffix 426 extracted from the token. The lengths of the features 425 and 426 (N1 and N2 characters respectively) may be selected based on statistical analysis of a corpus of text associated with the problem domain of interest in some embodiments. In at least one embodiment, multiple prefixes and/or multiple suffixes, of different lengths, may be utilized as token-level features.

According to some embodiments, a given token of a text attribute of an ER 402 may be provided as input to a selected hash function which maps the token to a number of a selected size (e.g., a 16-bit number), and the token hash value 427 produced using the hash function may be utilized as one of the features. The use of such hash values may be helpful in dealing with problem domains in which the number of distinct tokens encountered is very large (e.g., with new tokens being added frequently), and as a result vector embedding techniques derived from tools such as Word2Vec may not be able to provide embeddings for many of the encountered tokens. A token type feature 428 may be generated in at least some embodiments, indicating for example whether the token is alphabetical, numeric, alphanumeric or contains special characters.

A customized version of an embedding generation tool similar to Word2Vec may be created at an analytics service 102 for respective problem domains such as store catalog management, medical records management and the like. Using such an embedding generation tool, a respective vector embedding feature 429 may be generated for at least some text tokens. Such a tool may, for example, create n-dimensional vector embeddings from words or tokens in such a way that the n-dimensional distance between a given pair of vectors corresponding to a given pair of tokens is at least somewhat proportional to the difference in meanings between that pair of tokens. In some embodiments, tools similar to, or comprising customized versions of, fasttext, wiki2vec, entity2vec or the like may be used to generate token-level features. In at least one embodiment, machine learning models similar to, or comprising customized versions of, char-CNN (character level convolutional network models), n-gram-CNN, n-gram-LSTM (long short-term memory units) and the like may be used to create token-level and/or sub-token level features. In one embodiment, the analytics service may support a plug-in interface, which can be used to specify which such embedding tools are to be used for token-level embedding. In addition, in at least some embodiments, prior to generating the token-level features for ERs, the embeddings may be classified into groups (e.g., the embeddings for words such as "red", "green", "grey" etc. may all be placed into an embedding group representing "colors" with a particular embedding group identifier, the embeddings for words such as "square", "round", "oblong" etc., may be placed into an embedding group called "shapes", etc.) and a token-group vector embedding 430 (e.g., an embedding for the "colors" group, a different embedding for the "shapes" group, etc.) may be selected as one of the single-ER token-level features 420. Other combinations of Single-ER token-level features may be used in some embodiments than those shown in FIG. 4. Each of the features 421, 422, 423 etc. shown in FIG. 4 may be referred to as a token-level feature type in the subsequent discussion.

Figure 5:
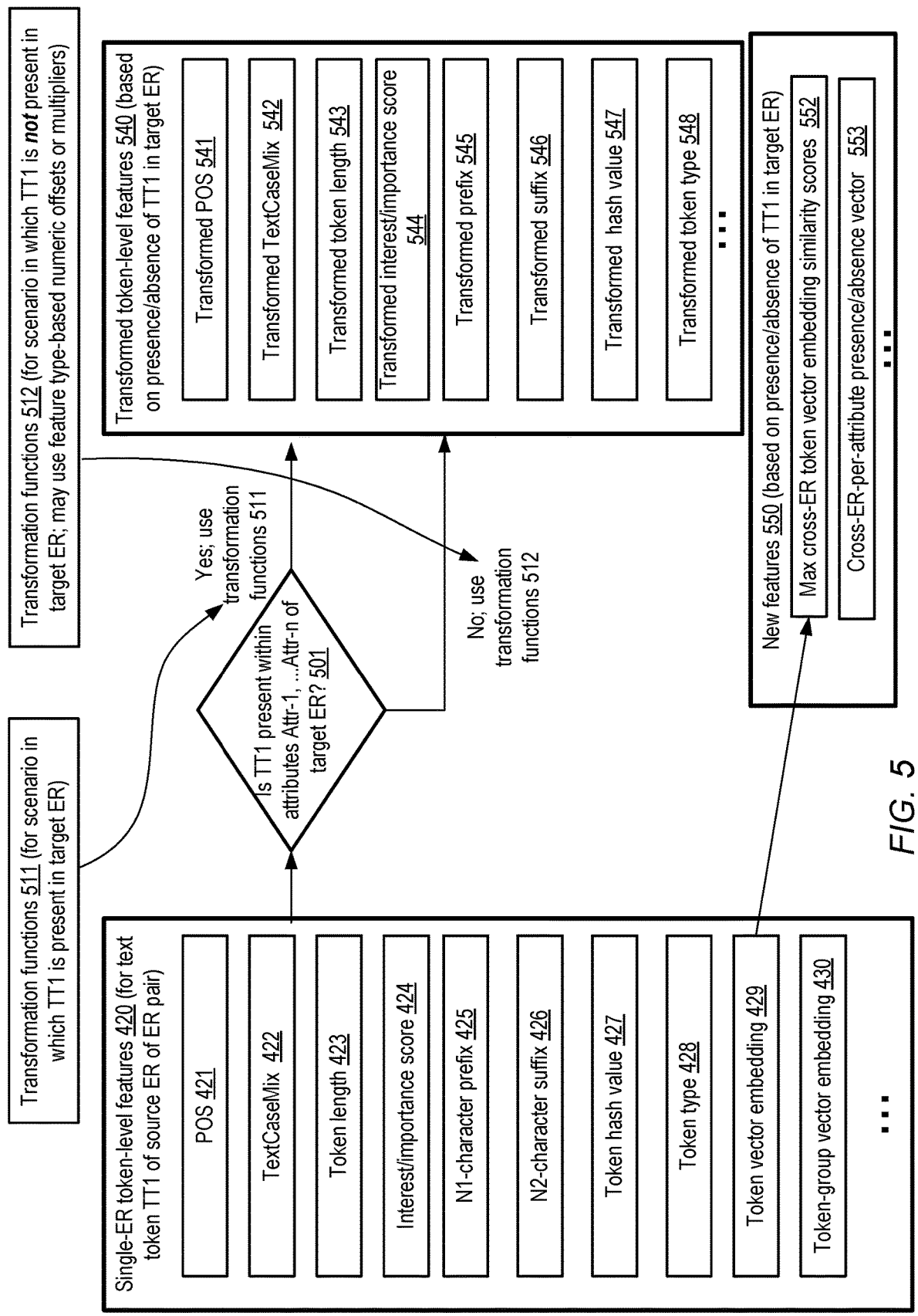
FIG. 5 illustrates example token-level features which may be generated based on examining text content of both entity records of a pair of entity records, according to at least some embodiments.

In contrast to the kinds of token-level features shown in FRIG. 4, which can be generated by examining a single ER of an ER pair, some features for a given text token of an ER may be generated only after examining the content of the other ER of the pair. FIG. 5 illustrates example token-level features which may be generated based on examining text content of both entity records of a pair of entity records, according to at least some embodiments. Single-ER token-level features 420 for a given text token TT1 of a source ER of an ER pair may be generated first in the depicted embodiment, i.e., prior to the generation of features based on the contents of both the source and target ERs of the pair.

One or more attributes Attr-1, Attr-n (e.g., including at least some text attributes) of the target ER may be examined to determine whether the text token TT1 is also present in those attributes as indicated in element 501. Such cross-ER presence of the same text token may help determine similarity and other relationships among the ERs in at least some embodiments, even if the text token is not present within the same attribute in both ERs.

If the token TT1 of the source ER is not present in any of the attributes of the target ER, different numeric feature values may be generated (for a given feature category such as part-of-speech or TextCaseMix) for TT1 than if TT1 is present in both ERs in the depicted embodiment. If TT1 is present in the other ER of the pair, a first set of transformation functions 511 may be applied to at least a subset of single-ER token-level features 420 representing TT1 to obtain transformed token-level features 540 for TT1. If TT1 is absent from the other ER, a different set of transformation functions 512 may be applied instead. In some embodiments, numeric versions of the features 420 for a given token such as TT1 may be generated (e.g., in the case of POS 421, "1" may be used as the numeric version of "noun", "2" may be used as the numeric version of "verb", etc.), and then different offsets to the numeric versions may be added depending on whether TT1 is present in, or absent from, the other ER. In one implementation, the added offset may be 0 for the case where the token is present in both ERs of the pair (that is, at least some transformation functions 511 may be identity functions), and non-zero for the case where the token is not present in the other ER. At least some of the added offsets of functions 512 may be based on vocabulary size of the corresponding feature type—e.g., if there are 5 different parts of speech (POSs) possible, represented initially by the integers 1-5, the offset 5 may be added to the part-of-speech numeric value to obtain a transformed POS value. Multipliers may be used instead of additive offsets in some embodiments.

In the depicted embodiment, transformed POS feature 541 may be obtained by applying a POS-specific transformation function to POS 421 based on whether TT1 is present in the other ER or not, while transformed TextCaseMix feature 542 may be obtained by applying a TextCaseMix-specific transformation function to TextCaseMix 422. Transformed token length 543, transformed interest/importance score 544, transformed prefix 545, transformed suffix 546, transformed hash value 547, and transformed token type 548 may similarly be determined by applying respective feature-type-dependent transformation functions 511 or 512.

In at least some embodiments, in addition to or instead of transforming some of the single-ER token-level features 420 as indicated above, one or more new features 550 which do not involve the use of transformation functions 511 or 512 may be generated for a given text token such as TT1 based on cross-ER analysis with respect to TT1 and the target ER. New features 550 may for example include max cross-ER token vector embedding similarity scores 552 and cross-ER-per-attribute presence/absence vector 553. To compute max cross-ER token vector embedding similarity scores 552 for TT1, the following computations may be performed in the depicted embodiment. Assume that there are N text attributes in the target ER, each comprising up to M text tokens. The max cross-ER token vector embedding similarity scores feature 552 comprises an N-element vector under this assumption. The token vector embeddings of all the M tokens of all of the N attributes may be computed, e.g., using the same embedding tool that is used to generate token vector embedding 429 for TT1. Then, a respective similarity score may be generated for token vector embedding 429 with respect to each of the (up to) M token vector embeddings of the 1$^{st}$ of the N attributes of the target ER, and the maximum similarity score from among those (up to) M scores may be selected as the first element of the N-element vector used for max cross-ER token vector embedding similarity scores 552. Similarly, a respective similarity score may be generated for token vector embedding 429 with respect to each of the (up to) M token vector embeddings of the 2$^{nd}$ of the N attributes of the target ER, and the maximum similarity score from among those (up to) M scores may be selected as the second element of the N-element vector used for max cross-ER token vector embedding similarity scores 552; similar computations may be performed until each of the N maximum similarity scores are determined for the vector 552. Intuitively, the scores included in vector 552 indicate how similar the tokens in each of the other ER's attributes are to the token TT1. In one embodiment, the feature 552 may only be generated in the scenario in which TT1 is not present in the other ER.

If the target ER contains N text attributes, in at least some embodiments, the cross-ER-per-attribute presence/absence vector 553 may also comprise N elements. The nth element of vector 553 may be set to 1 if the nth attribute of the target ER contains TT1, and set to 0 if the nth attribute of the target ER does not contain TT1. Similar features to those shown in FIG. 5 may be generated for each text token in each text attribute of each ER of an ER pair in at least some embodiments. Other types of features dependent on whether a given text token such as TT1 is present in or absent from both ERs of a pair may be generated in some embodiments than those shown in FIG. 5.

Example Token-Level and Attribute-Level Analysis

Figure 6:
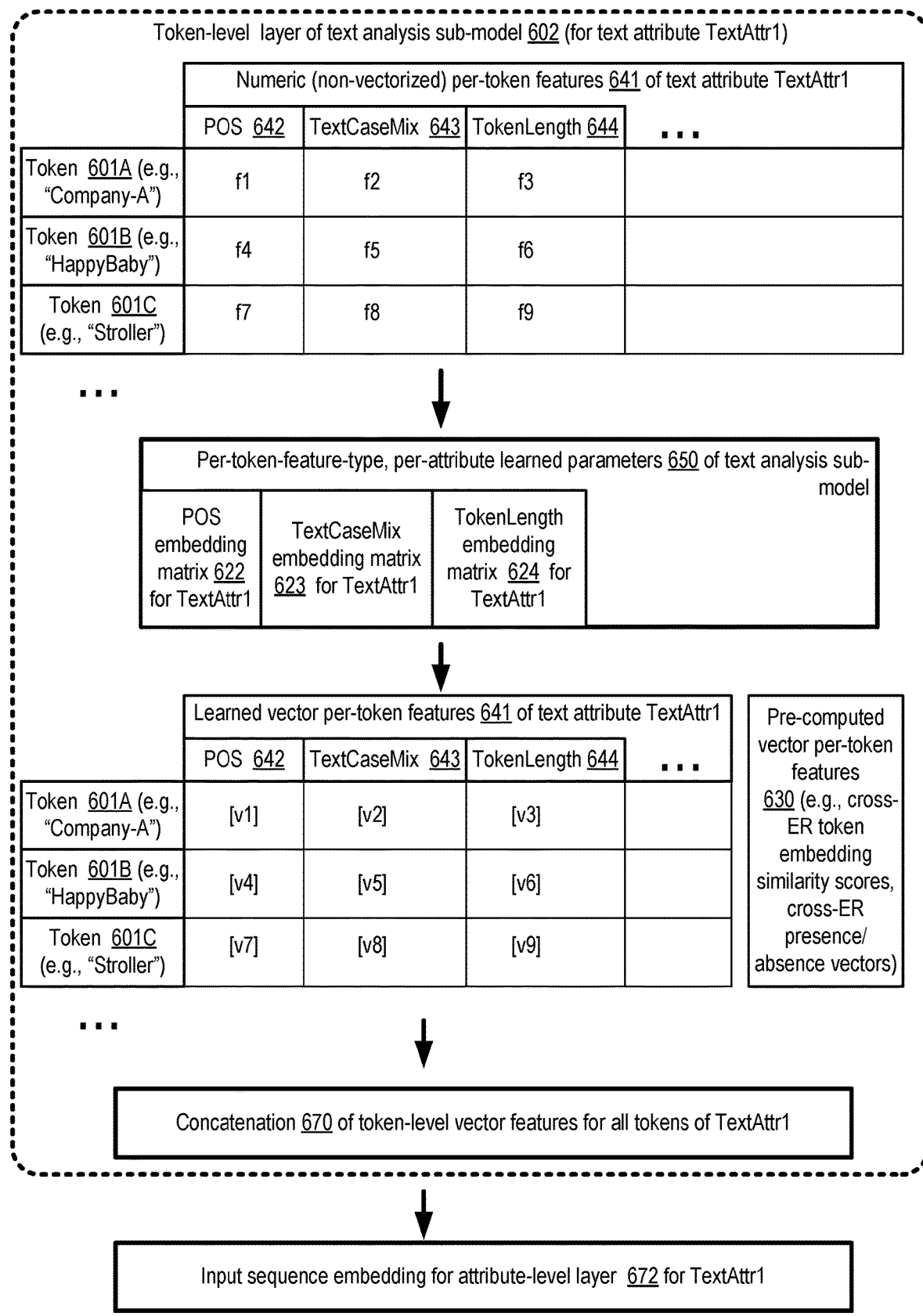
FIG. 6 illustrates aspects of an example token-level layer of a text analysis sub-model of a machine learning model which may be employed for record relationship analysis, according to at least some embodiments.

After the feature sets discussed above in the context of FIG. 4 and FIG. 5 are generated for text attributes, they (or transformed/combined versions thereof) may be provided as input to a text analysis sub-model of a multi-modal machine learning model as indicated in FIG. 3. The text analysis model may itself comprise a token-level layer and a separate attribute-level layer in at least some embodiments. FIG. 6 illustrates aspects of an example token-level layer of a text analysis sub-model of a machine learning model which may be employed for record relationship analysis, according to at least some embodiments. A different set of parameters may be learned with respect to each text attribute of an ER in the depicted embodiment—that is, the learned representation of the same token may differ depending on whether the token is part of text attribute TextAttr1 (e.g., an "Item name" text attribute or a "Brand" text attribute) or text attribute TextAttr2.

In the embodiment depicted in FIG. 6, a token-level layer 602 of the text analysis sub-model for a text attribute TextAttr1 is shown by way of example. Per-token features 641 of each of the tokens 601 of TextAttri1, such as token 601A (e.g., "Company-A"), token 601B ("e.g., "Happy-Baby"), and token 601C (e.g., "Stroller") may be provided as input to the token-level layer 602. Such per-token features may include, values (f1, f4 and f7) for POS 642, (f2, f5 and f8) for TextCaseMix 643, (f3, f6 and f9) for TokenLength 644, and so on. The token-level layer may comprise one or more neural network layers that learn per-token-feature-type, per-attribute parameters 650 in the depicted embodiment, although model types that do not require neural networks may be used in other embodiments. The learned parameters may include a POS embedding matrix 622 specific to TextAttr1, a TextCaseMix embedding matrix 623 specific to TextAttr1, a TokenLength embedding matrix 624 specific to TextAttr1, and similar embedding matrices for other token feature types.

Using these learned per-token-feature-type embedding matrices, learned vector per-token features 641 may be generated for each of the tokens of TextAttr1 in the depicted embodiment. These learned vector features may include vectors [v1], [v2], [v3], [v4], [v5], [v6], [v7], [v8], and [v9] corresponding to the previously generated features f1, f2, f3, f4, f5, f6, f7, f8, and f9 respectively. The learned vector features [v1]-[v9] may be combined with one or more pre-computed vector per-token features 630 (such as the features 552 and 553 shown in FIG. 5) to produce a concatenation 670 of token-level vector features for all text tokens of TextAttr1 and provided as an input sequence embedding for attribute-level layer 672 of the text analysis sub-model for TextAttr1 in the depicted embodiment.

Figure 7:
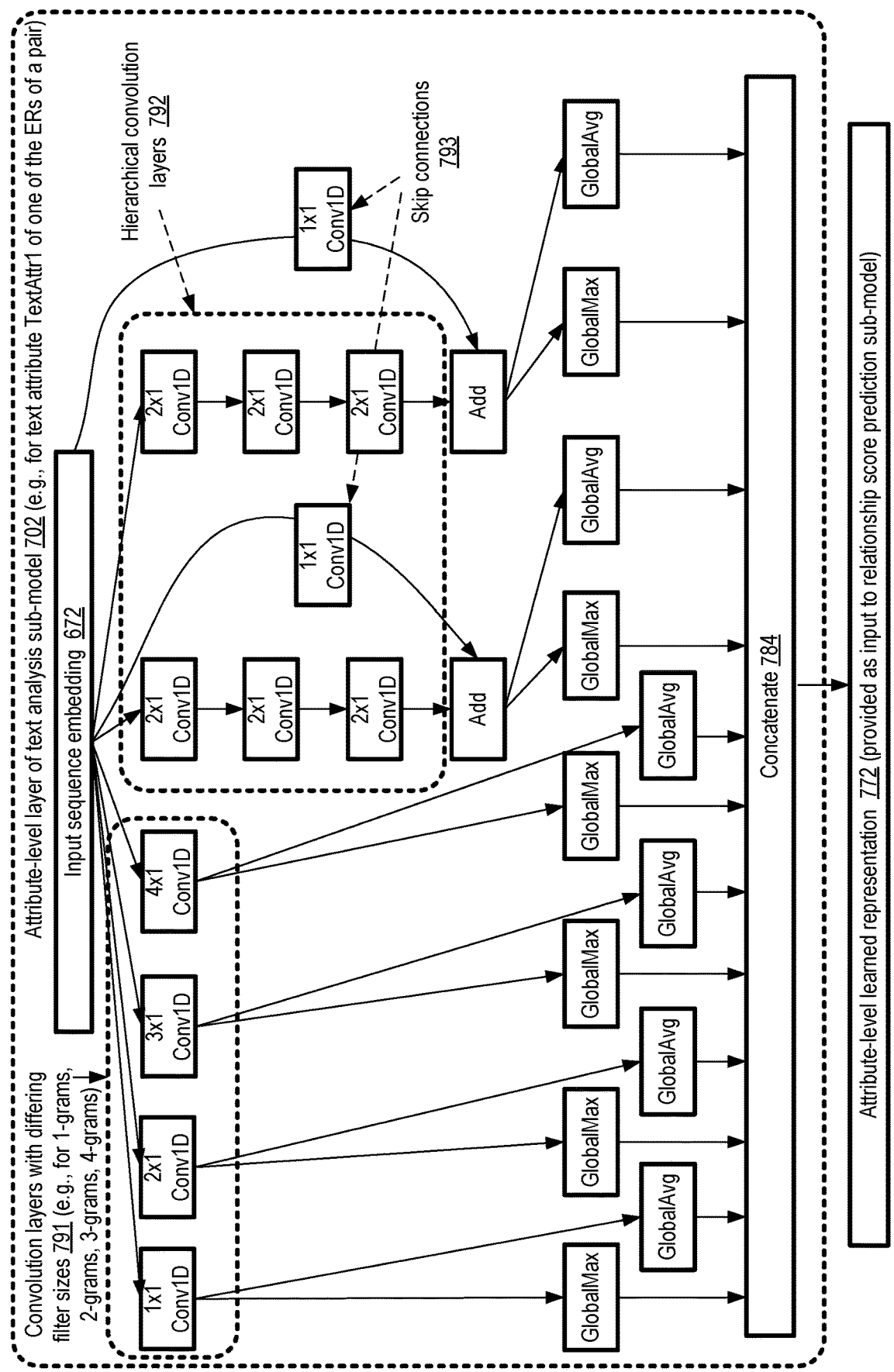
FIG. 7 illustrates aspects of an example attribute-level layer of a text analysis sub-model of a machine learning model which may be employed for record relationship analysis, according to at least some embodiments.

FIG. 7 illustrates aspects of an example attribute-level layer of a text analysis sub-model of a machine learning model which may be employed for record relationship analysis, according to at least some embodiments. In various embodiments, a mirrored or Siamese neural network may be used at the attribute layer of the text analysis sub-model;

FIG. 7 shows details of one mirror, whose parameters may be shared with the other mirror. Each mirror consumes an input sequence embedding of the tokens of one text attribute from one ER of an ER pair. Attribute-level layer 702 may include a plurality of neural network subcomponents or sub-networks in the depicted embodiment, to which the learned input sequence embedding 672 for the tokens of a given text attribute such as TextAttr1 of one of the ERs of a pair may be provided as input. One such sub-network may comprise convolution layers with differing filter sizes 791, each configured to analyze n-grams (combinations of n successive tokens) of a different length in some embodiments. Thus, for example 1-dimensional convolution layers with a 1×1 filter size (1×1 Conv1D), 2×1 filter size (2×1 Convd1D), 3×1 filter size (3×1 Convd1D), and 4×1 filter size (4×1 Convd1D) may be used for learning representations of 1-grams (single tokens), 2-grams (sequences of 2 successive tokens), 3-grams (sequences of 3 consecutive tokens) and 4-grams (sequences of 4 consecutive tokens) respectively.

Hierarchical convolution layers 792, comprising for example three sequentially arranged convolution layers (with 2×1 Conv1D layers at each layer) may be used to learn about hierarchical concepts expressed in the text attributes in the depicted embodiment, and thereby derive condensed predictive information from potentially lengthy text contents. The sequence of three 2×1 Conv1D layers, with a down-sampling factor of 2 after each layer, may learn across a window spanning 2×2×2 or 8 tokens, in contrast to learning only across 2 tokens with a single 2×1 layer. In combination with the non-hierarchical convolution layers 791, the hierarchical layers 792 enable the attribute-level layer to details efficiently for a wide variety of text token combinations, using a variety of filter sizes and kernel sizes.

The attribute-level layer may also comprise one or more skip connections 793 associated with at least some of the hierarchical layers 792 in various embodiments, enabling residual mappings which make the overall network easier to optimize. If, for example, one of the hierarchical blocks of three 2×1 layers results in vanishing gradients, such a block may in effect be skipped and an identity mapping may be learned instead using the corresponding skip connection.

In the depicted embodiment, instead of using only maximum global pooling, as in some traditional neural network-based models, a combination of maximum global pooling (as indicated by the elements labeled GlobalMax) and average global pooling (as indicated by the elements labeled GlobalAvg) may be employed. The results from both types of pooling may be concatenated in layer 784 to produce the final attribute-level learned representation 772 which is provided as input to relationship score prediction sub-model. Maximum global pooling uses the maximum activation output for each dimension of embedding across the input sequence, and this may potentially lead to ignoring contributions of some tokens (other than the tokens which produce the maximum activation output). Using the average global pooling information in addition to the maximum global pooling enables such other tokens to also contribute to the representation provided to the relation score prediction sub-model in various embodiments. Note that other combinations of neural network subcomponents may be employed in at least some embodiments than those shown in FIG. 7 for the attribute-level layer of the text analysis sub-model—e.g., fewer or more different filter sizes may be used in convolution layers 791, fewer or more hierarchical blocks may be used in layer 792, and so on. In some embodiments, at least some subcomponents which do not include neural networks may be used for the attribute-level layer.

Example Non-Text Analysis

Figure 8:
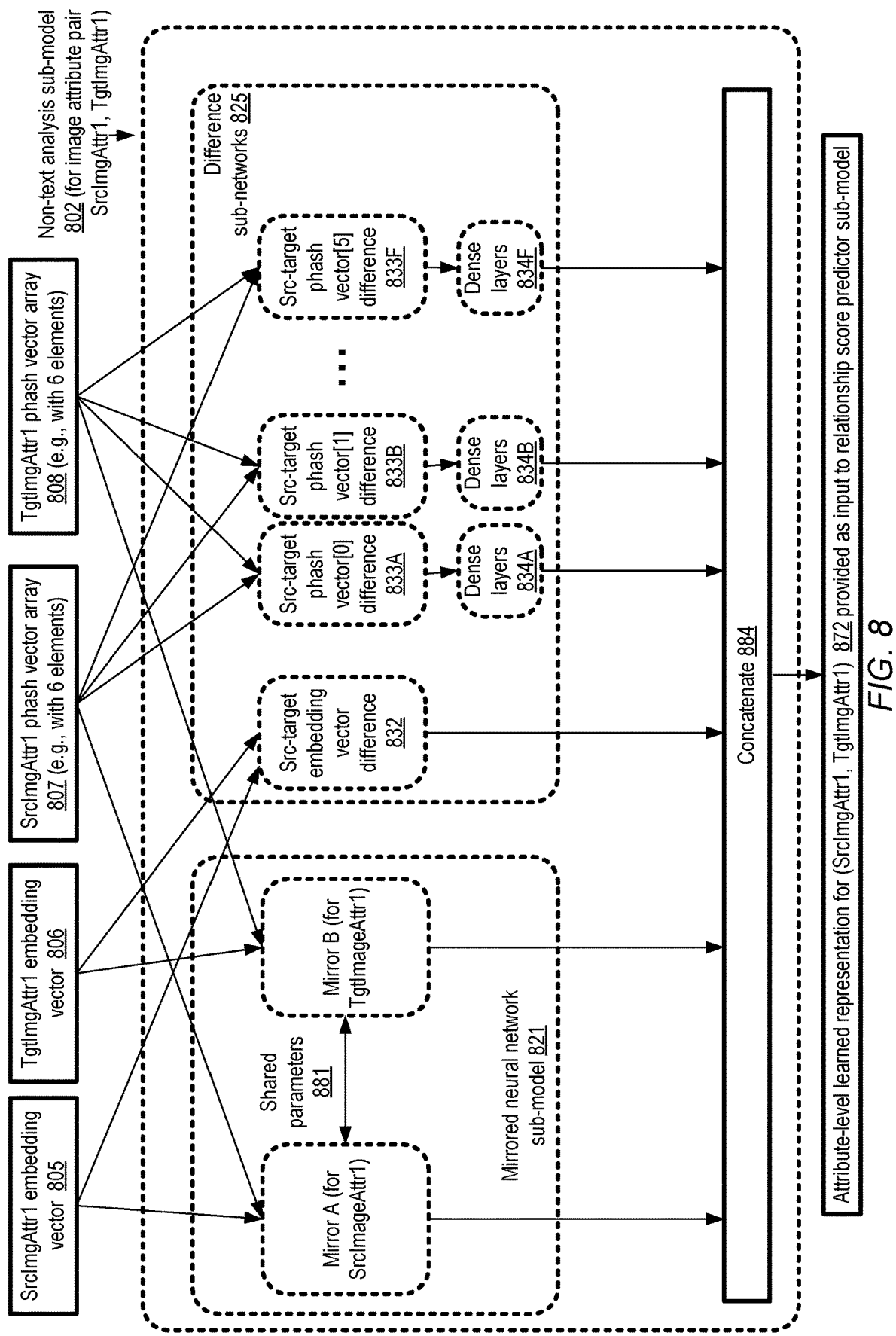
FIG. 8 illustrates aspects of an example non-text analysis sub-model of a machine learning model which may be employed for record relationship analysis, according to at least some embodiments.

FIG. 8 illustrates aspects of an example non-text analysis sub-model of a machine learning model which may be employed for record relationship analysis, according to at least some embodiments. In the depicted embodiment, each entity record (ER) is assumed to comprise an image attribute or field, in addition to text attributes of the kind discussed above. The image attribute of the source ER is referred to as SrcImgAttr1 in FIG. 8, and the image attribute of the target ER is referred to as TgtImgAttr1.

A respective set of features may be generated for SrcImgAttr1 and TgtImgAttr1 in the depicted embodiment, and provided as input to non-text analysis sub-model 802. SrcImgAttr1 embedding vector 805 and TgtImgAttr1 embedding vector 806 may be generated from SrcImgAttr1 and TgtImgAttr1 respectively using a selected image embedding tool in the depicted embodiment. Such a tool may create n-dimensional vector embeddings from images in such a way that the n-dimensional distance between a given pair of vectors corresponding to a given pair of images is at least somewhat proportional to the difference (e.g., in pixel color values) between that pair of images. In some embodiments, custom versions of such tools may be created for each problem domain (e.g., store catalog management, medical records management, etc.) for which relationship analysis is performed at an analytics service similar to service 102 of FIG. 1.

In at least some embodiments, one or more perceptual hash (phash) representations may be generated from SrcImgAttr1, and corresponding phash representations may be generated from TgtImgAttr1, and included in the feature set provided as input to the non-text analysis sub-model. For example, SrcImgAttr1 phash vector array 807 and TgtImgAttr1 phash array may 808 each comprise up to 6 phash vectors in one implementation. A given phash vector of the array may correspond to one of several color channels of selected color spaces. Examples of such color spaces may include the RGB space which has red, green and blue channels, the LAB color space which has respective channels for lightness (L), a first range of colors from green to red (referred to as the "A" channel), and another range of colors from blue to yellow (referred to as the "B" channel). A phash vector may be considered a signature of the underlying image's perceptual content. Phashes may be useful, for example, for detecting duplicates or similarities among images (or other non-text attributes) because they are robust against distortions such as minor image processing alterations, in contrast to other types of cryptographic hashes.

In the embodiment depicted in FIG. 8, the non-text analysis sub-model 802 may comprise a mirrored neural network sub-model 821, which in turn includes a pair of mirrored neural networks (mirror A for SrcImgAttr1 features, and mirror B for TgtImgAttr1 features) with shared parameters 881. Input to mirror A may comprise SrcImgAttr1 embedding vector 805 and SrcImgAttr1 phash vector array 807 in the depicted embodiment, while input to mirror B may comprise TgtImgAttr1 embedding vector 807 and TgtImgAttr1 phash vector array 808. The mirrored sub-model may generate output comprising learned representations of the two image attributes in the depicted embodiment, which is concatenated (in concatenate layer 884) with output produced by a set of difference sub-networks 825.

In the difference sub-networks 825 a vector difference 832 may be computed between the respective embedding vectors 805 and 806 in the depicted embodiment. Further, vector differences may also be computed between the respective phash vectors generated for each channel for the two image attributes SrcImgAttr1 and TgtImgAttr1 (in components 833A-833F of the non-text analysis sub-model) and passed through one or more dense neural network layers 834 (e.g., 834A-834F) in at least some embodiments. The concatenation of the representations generated from SrcImgAttr1 and TgtImgAttr1 in the mirrored neural network sub-model and the difference sub-networks, obtained in concatenate layer 884) may be referred to as an attribute-level learned representation 872 for the image attribute pair. This image-based learned representation, obtained by applying non-linear transformations in mirrored sub-model 821 and difference sub-networks 825 may be provided as input to the relationship score prediction sub-model, along with learned representations of text attributes in at least some embodiments. Such a combination of learned representations of text and non-text attributes may be referred to as multi-modal analysis or generalized pooling in at least some embodiments. Note that although feature generation and neural network-based learning with respect to only a single image attribute in each ER is illustrated in FIG. 8, similar feature generation and analysis techniques may be applied to multiple non-text attributes of ERs as needed—e.g., for multiple image, video or audio attributes per ER. In some embodiments, the non-text analysis sub-model 802 may include machine learning models which do not necessarily or only utilize neural networks.

Example Programmatic Interactions

Figure 9:
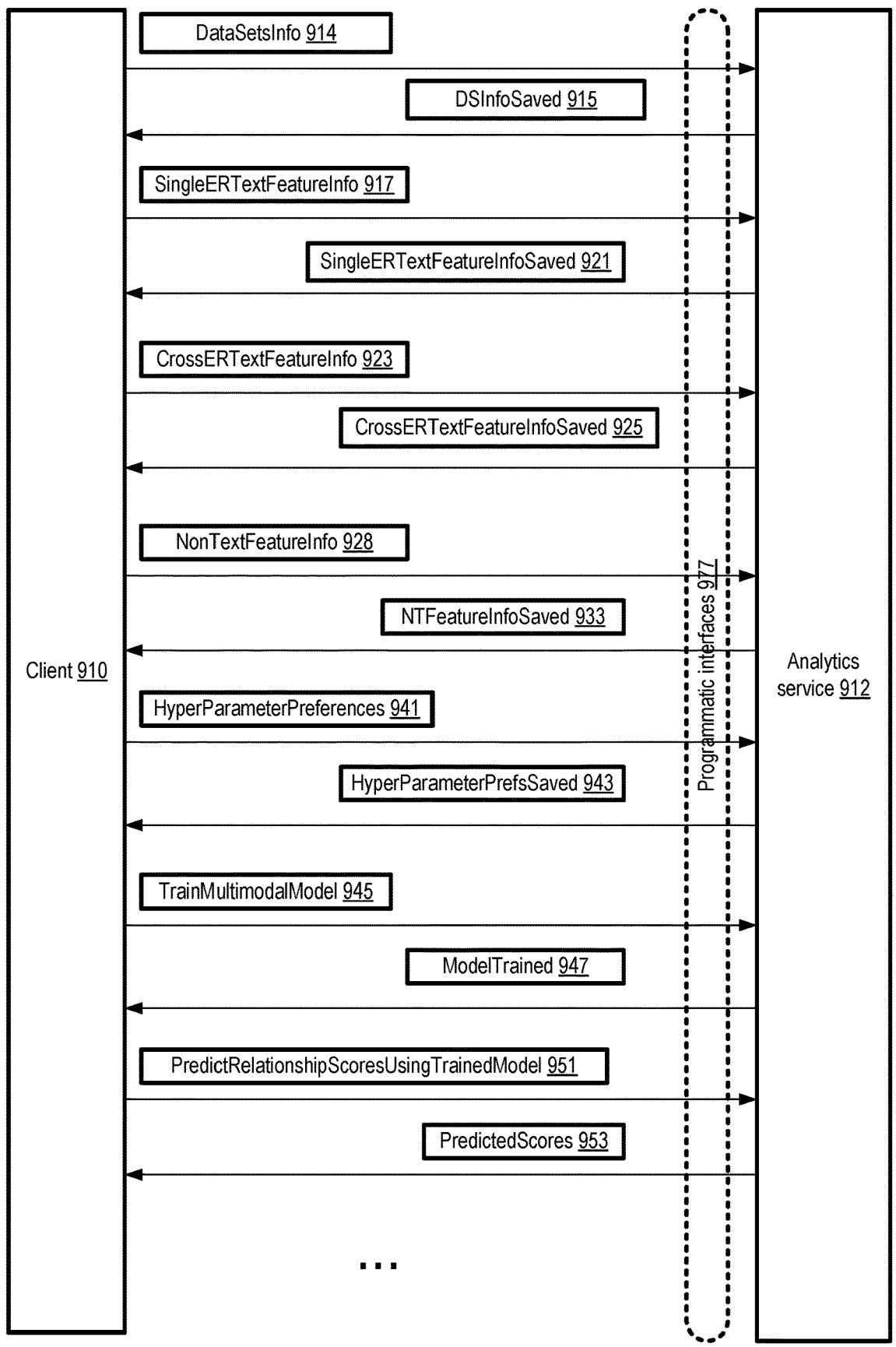
FIG. 9 illustrates example programmatic interactions pertaining to multi-modal record relationship analysis, according to at least some embodiments.

FIG. 9 illustrates example programmatic interactions pertaining to multi-modal record relationship analysis, according to at least some embodiments. An analytics service 912, similar in features and functionality to analytics service 102 of FIG. 1, may implement a set of programmatic interfaces 977 in the depicted embodiment, enabling clients 910 of the service to submit messages/requests pertaining to relationship analysis of entity records and receive corresponding responses. The interfaces 977 may include, among others, one or more web-based consoles, a set of application programming interfaces (APIs), command-line tools, graphical user interfaces and the like in various embodiments.

A client 910 may submit a DataSetsInfo message 914 via programmatic interfaces 977 in some embodiments, indicating one or more data sets comprising entity records for which multi-modal relationship analysis is to be performed. In at least one embodiment, the client may also provide an indication of labeled data sets (comprising pairs of ERs with labels/scores indicative of the similarity, dissimilarity, containment or other relationships between the ERs of the pairs) in the DataSetsInfo message 914, which can be used to train, text and evaluate a multi-modal machine learning model of the kind discussed earlier, e.g., in the context of FIG. 3. The information about data sets may be stored at a repository of the analytics service 912, and a DSInfoSaved response message 915 may be sent to the client 910 in the depicted embodiment.

In various embodiments, a client 910 may provide guidance to the analytics service about the kinds of features which are to be generated from text attributes and/or non-text attributes and used as input for the multi-modal relationship analysis model. A SingleERTextFeatureInfo message 917 may indicate the kinds of text-based features to be generated considering only a single ER of a pair at a time (such as the token-level features 420 of FIG. 4) in the depicted embodiment. A CrossERTextFeatureInfo message 923 may indicate the kinds of text-based features to be generated considering the presence/absence of a given token of a given ER of an ER pair in the other ER of the pair (similar to the features discussed in the context of FIG. 5) in some embodiments. NonTextFeatureInfo message 928 may be used by the client to provide information about the kinds of features to be generated for non-text attributes (similar to the image embedding and phash-based features discussed in the context of FIG. 8) in at least some embodiments. Such feature engineering related messages 917, 923 and 928 may, for example, indicate the algorithms/tools/programs to be used to generate the features, as well as the manner in which the features are to be combined (e.g., the order in which the features are to be concatenated), and so on. In response to messages 917, 923 and 928, the analytics service may store the provided feature-related guidance and send respective response messages SingleERTextFeatureInfoSaved 921, CrossERTextFeatureInfoSaved 925, and NTFeatureInfoSaved 933 in some embodiments.

A client 910 may provide values of one or more hyper-parameters of the various subcomponents of the multi-modal machine learning model to be used to analyze ER relationships using HyperParameterPreferences message 941 in some embodiments. The client may, for example, indicate the kinds of machine learning algorithms to be used for text analysis, non-text analysis, and relationship score prediction, the structure of the models (e.g., the number of convolution layers, filter sizes, hierarchical blocks, sizes of embedding matrices, etc.) for neural network models, the loss functions to be used, learning rates, training completion criteria, etc. A HyperParameterPrefsSaved message 943 may be sent in response to the client 910 from the analytics service 912 in at least some embodiments after the hyper-parameter information is received and stored.

A client 910 may submit a TrainMultimodalModel request 945 to initiate training of a machine learning model similar to model 350 of FIG. 3 in the depicted embodiment. In at least some embodiments, the training request 945 may specify subsets of labeled data to be used for training, testing and/or evaluating the model. In response to a training request 945, the analytics service 912 may generate features and perform the requested training, and send a Model-Trained message 947 after the training is complete. In some embodiments, a separate request to generate the text and non-text features may be submitted via interfaces 977 prior to the training request. In at least some embodiments, feature generation may be performed using several different resources of the analytics service in parallel—e.g., different features for a given ER pair may be generated in parallel using respective computing devices, and/or features for different ER pairs may be generated in parallel using respective computing devices.

A PredictRelationShipScoresUsingTrainedModel request 951 may be submitted in some embodiments, indicating one or more pairs of ERs for which relationship analysis is to be performed using a trained version of the multi-modal model. In response, the trained model may be executed using resources of the analytics service, and the relationship scores generated by the trained model may be transmitted to the client 910 via one or more PredictedScores messages 953. The scores may also be sent to other destinations indicated by the client, such as automated catalog management systems, store website management systems, search engines, and the like in at least some embodiments. In at least some embodiments, programmatic interactions other than those shown in FIG. 9 for ER relationship analysis may be supported by an analytics service 912.

Example Provider Network Environment

Figure 10:
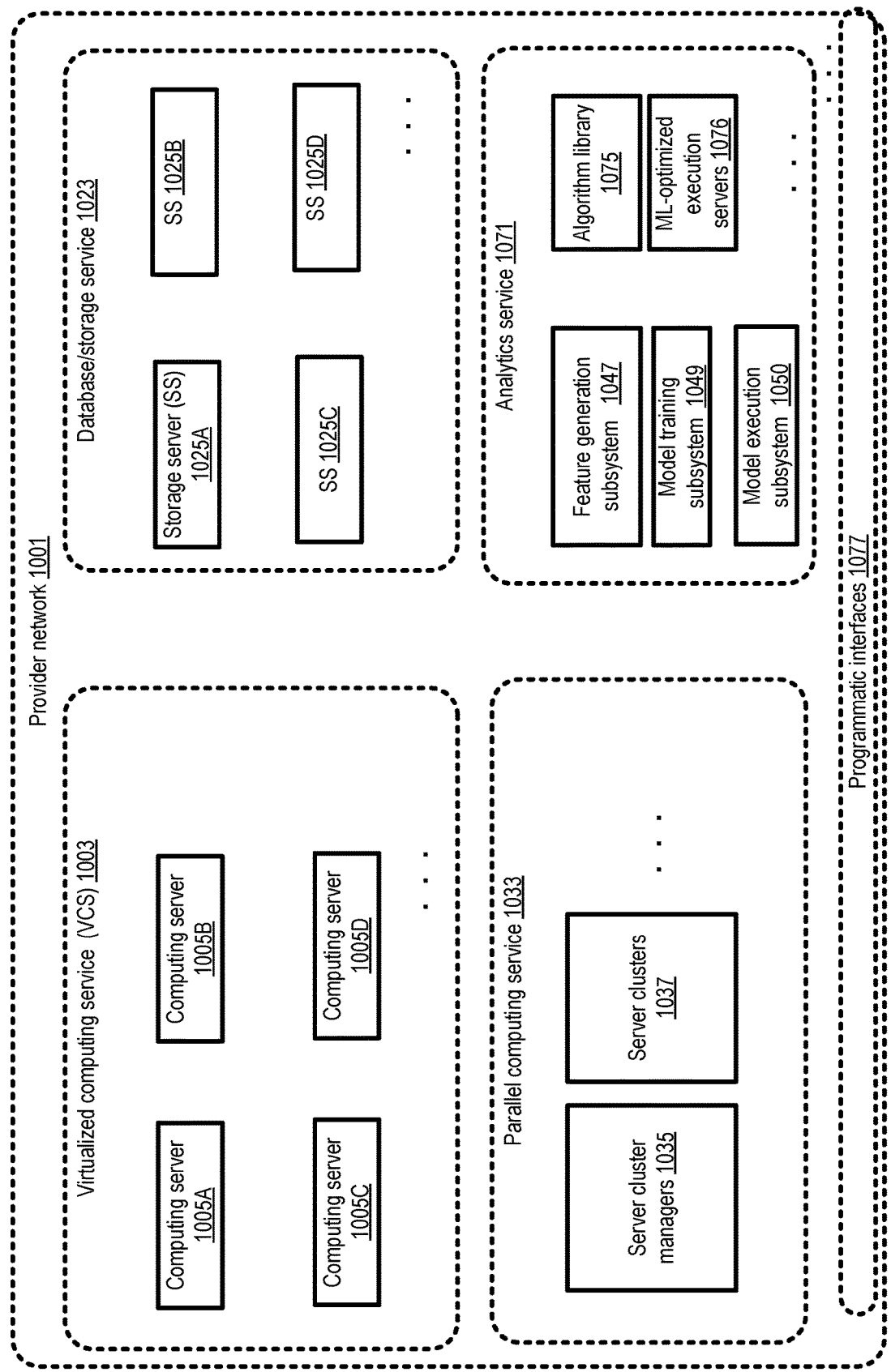
FIG. 10 illustrates an example provider network environment in which an analytics service may be implemented, according to at least some embodiments.

In various embodiments, as mentioned above, an analytics service at which multi-modal relationship analysis of entity records is performed may be one of a suite of services of a provider network or cloud computing environment. FIG. 10 illustrates an example provider network environment in which an analytics service may be implemented, according to at least some embodiments. In the depicted embodiment, provider network 1001 may comprise resources used to implement a plurality of services, including for example a virtualized computing service (VCS) 1003, a database/storage service 1023, and a parallel computing service 1033 as well as an analytics service 1071 similar in features and capabilities to analytics service 102 of FIG. 1. The analytics service 1071 in turn may comprise at least a feature generation subsystem 1047 (used for generating features from text and/or non-text attributes of entity record pairs), a model training subsystem 1049 responsible for training multi-modal models of the kind discussed earlier, and a model execution subsystem 1050 at which trained versions of the multi-modal models are run to produce relationship scores. In at least some cases, machine learning models of an algorithm library 1075, implemented at a set of machine-learning-optimized execution servers 1076, may be used for various tasks at subsystems 1047, 1049 and 1050. The parallel computing service 1033 may comprise various server clusters 1037, each comprising a plurality of servers, on which parallelizable workloads may be distributed by a set of server cluster managers 1035 in the depicted embodiment. Some of the algorithms implemented at the analytics service may be parallelizable, and may utilize the server clusters 1037 in at least some embodiments. Furthermore, feature generation operations may be performed in parallel for various ER pairs using the parallel computing service 1033 in one embodiment—e.g., with different text and non-text features of a given ER pair being generated in parallel, and/or with features being generated in parallel for different ER pairs.

Components of a given service may utilize components of other services in the depicted embodiment—e.g., for some analytics service tasks, virtual machines implemented at computing servers such as 1005A-1005D of the virtualized computing service 1003 may be used, server clusters 1037 and/or cluster managers 1035 may be utilized for parallelizable computations of the analytics service, input data and/or output produced at the analytics service may be stored at storage servers 1025 (e.g., 1025A-1025D) of storage service 1023, and so on. Individual ones of the services shown in FIG. 10 may implement a respective set of programmatic interfaces 1077 which can be used by external and/or internal clients (where the internal clients may comprise components of other services) in the depicted embodiment.

In some embodiments, at least some aspects of the relationship analysis techniques may be implemented without acquiring resources of network-accessible services such as those shown in FIG. 10. For example, a standalone tool implemented at one or more computing devices which are not part of a network-accessible service may be used in one embodiment.

Methods for Multi-Modal Relationship Analysis of Entity Record Pairs

Figure 11:
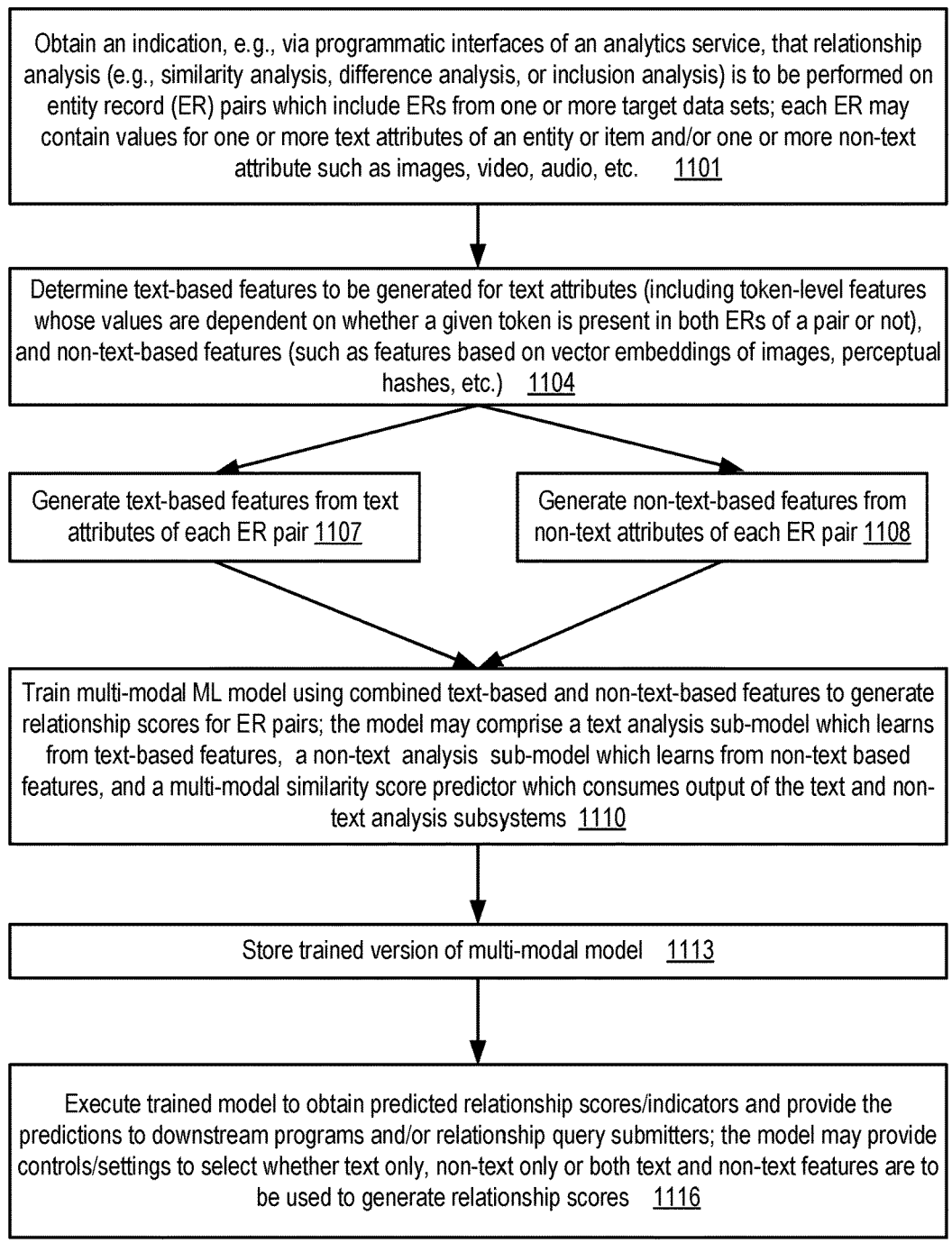
FIG. 11 is a flow diagram illustrating aspects of operations that may be performed to analyze relationships between pairs of entity records, according to at least some embodiments.

FIG. 11 is a flow diagram illustrating aspects of operations that may be performed to analyze relationships between pairs of entity records, according to at least some embodiments. As shown in element 1101, an indication may be obtained, e.g., via programmatic interfaces of an analytics service similar to service 102 of FIG. 1, that relationship analysis (e.g., similarity analysis, difference or dissimilarity analysis, and/or inclusion analysis) is to be performed on pairs of entity records (ERs). The two ERs of a given pair may be part of a single data set (e.g., in scenarios in which deduplication of records of the data set is to be performed) or may belong to different data sets (e.g., in scenarios in which the closest match is to be found for a given ER from a specified data set of which that ER is not a member). Individual ERs may comprise values of one or more text attributes and/or one or more non-text attributes (such as images, audio, or video) in various embodiments. The combination of attribute values of a given ER may represent a real-world entity or item, such as a store catalog item, a record of a medical event or medical history, and so on.

A set of categories of text-based features to be generated from the text attribute(s) of ER pairs, as well as a set of categories of non-text based features to be generated from the non-text attributes of the ER pairs may be identified in various embodiments (element 1104). In at least some embodiments, the text features for a given ER pair may comprise some features which require processing or examination of a single ER of the pair, as well as other features which require processing or examination of both ERs—e.g., with different feature values being generated for a given text token depending on whether the text token is present in just one of the ERs or on both ERs of the pair. Text-based features may be generated for each ER of the ER pair; as such, the text feature set for an ER pair may include a first-record text feature subset and a second-record text feature subset. The text features whose values depend on the whether a token is present in both ERs of the pair (the first ER and the second ER) may be referred to as pairwise-text-analysis-result features in some embodiments. Such pairwise-text-analysis-result features may, for example, include an array indicating the particular attributes of the second ER in which a given text token of the first ER is present, and/or a feature based on respective similarity scores of a vector representation of a token of the first ER and vector representations of tokens of one or more attributes of the second ER.

The non-text features to be generated may vary depending on the type of non-text attribute in various embodiments. For example, in a scenario in which each ER of a pair comprises an image attribute, the non-text feature set may include features based on vector embeddings of the image attributes, perceptual hash (phash) representations of the image attributes, and so on. In some embodiments, a client of an analytics service on whose behalf the relationship analysis is to be performed may provide an indication of at least some of the categories of text and/or non-text features whose values are to be generated. In other embodiments, at least some of the feature categories may be selected at the analytics service, e.g., based on knowledge base entries or the like.

The text-based and non-text based features may be generated from a collection of ER pairs to be used for training a multi-modal machine learning model in various embodiments (elements 1107 and 1108). In at least some embodiments, feature generation may be performed in parallel for different ER pairs, or even within a single ER pair—e.g., different resources may be used concurrently to generate values for different feature categories. Labels indicating the strength of relationships among the ERs of individual ER pairs may be obtained for the ER pairs of a training and test data set in at least some embodiments, e.g., from human annotators.

Using the generated text and non-text features and the labels, a multi-modal machine learning (ML) model may be trained in various embodiments to predict relationship scores for ER pairs (element 1110). The model may, for example, include a text analysis sub-model which learns and performs non-linear transformations on the text-based features, as well as a non-text analysis sub-model which learns from and performed non-linear transformations on the non-text based features. The output learned representations of the text and non-text sub-models may be provided as input to a multi-modal relationship score predictor in various embodiments. In some embodiments, neural networks of various configurations may be used for the text analysis sub-model, the non-text analysis sub-model and/or the relationship score predictor. In at least one embodiment, for example, the text analysis sub-model may comprise a token-level layer and an attribute-level layer. In some embodiments, the attribute-level layer may comprise a convolutional sub-network with a plurality of filters including a first filter with a first filter size corresponding to a first number of successive text tokens, a second filter with a second filter size corresponding to a second number of successive text tokens, as well as a collection of hierarchically-arranged neural sub-networks with one or more skip connections. In the non-text sub-model, computations may be performed on differences between respective non-text features of the two ERs of a pair in at least some embodiments.

A trained version of the multi-modal model mat be stored (element 1113), e.g., at a repository of an analytics service. In some embodiments, respective multi-modal models may be trained for different relationship categories—e.g., one model may be trained for similarity analysis, another for inclusion analysis (in which the predicted score indicates how likely it is that the entity corresponding to one ER of a pair is included within or part of the entity represented by the second ER). In at least one embodiment, different multi-modal models may be trained for respective problem domains for a given relationship category—e.g., one model may be trained for detecting similarities between store catalog item records, another model may be trained for detecting similarities between medical records, and so on.

A trained version of a multi-modal model may be run to obtain predicted relationship scores/indicators in various embodiments (element 1116). The predictions may be provided to downstream programs and/or to relationship query submitters. The model may provide controls/settings that can be used to select the subset of attributes which are to be used to generate the relationship scores in some embodiments. For example, if desired, the model may be run in text-only mode, in which case only features obtained from text attributes of the input ER pairs would be generated, and the non-text components of the model may not be used. Alternately, the model may be run in image-only mode, video-only mode, audio-only mode or the like, so that content of a particular modality or combination of modalities is used to generate features and obtain relationship predictions. In at least some embodiments, by default, both text and non-text features may be generated from the ER pairs and used for generating the relationship scores.

It is noted that in various embodiments, some of the operations shown in FIG. 11 may be implemented in a different order than that shown in the figure, or may be performed in parallel rather than sequentially. Additionally, some of the operations shown in FIG. 11 may not be required in one or more implementations.

Use Cases

The techniques described above, of using a combination of text and non-text features and a multi-modal machine learning model to generate relationship scores, may be useful in a variety of scenarios. For example, such techniques may be used to identify and remove/merge duplicate records from store catalogs, to identify similar medical conditions among different patients, and so on. The proposed techniques may also be used to enhance the quality of search results, to organize products of a catalog appropriately, and so on.

Illustrative Computer System

Figure 12:
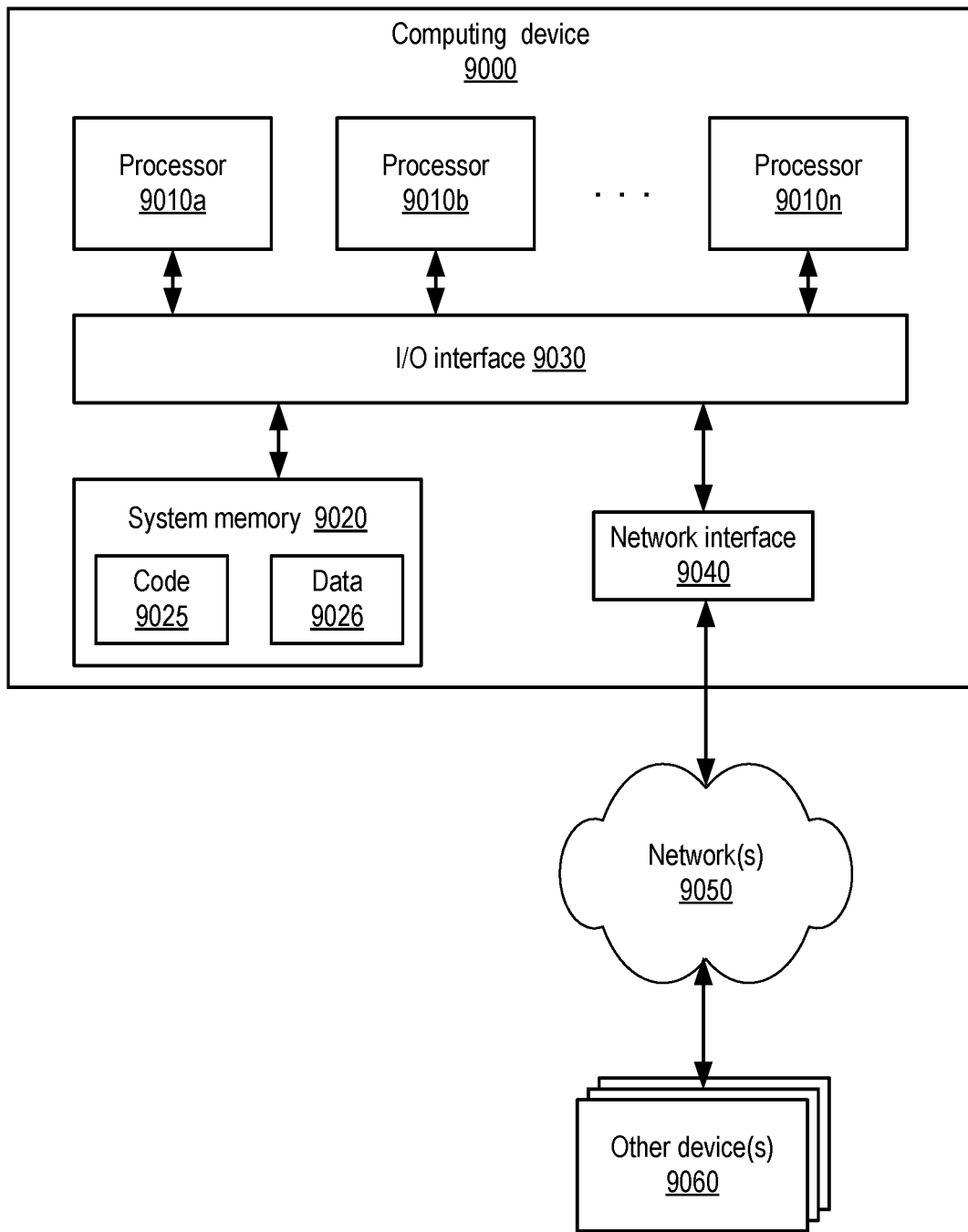
FIG. 12 is a block diagram illustrating an example computing device that may be used in at least some embodiments.

In at least some embodiments, a server that implements the types of techniques described herein (e.g., various functions of an analytics service), may include a general-purpose computer system that includes or is configured to access one or more computer-accessible media. FIG. 12 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 11, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 11. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices;
wherein the one or more computing devices include instructions that upon execution on or across the one or more computing devices cause the one or more computing devices to:
obtain a data set comprising a plurality of pairs of entity records, wherein individual entity records of the plurality of pairs comprise a plurality of attributes including at least a first text attribute and at least a first image attribute, wherein the first text attribute comprises one or more text tokens;
generate a respective text feature set corresponding to individual pairs of the plurality of pairs, wherein a text feature set corresponding to a first pair of the plurality of pairs comprises a first-record text feature subset corresponding to a first entity record of the first pair and a second-record text feature subset corresponding to a second entity record of the first pair, wherein generating the first-record text feature subset comprises:
(a) determining whether a first text token of a first text attribute of the first entity record is present within one or more text attributes of the second entity record;
(b) generating, based at least in part on a result of said determining, a first pairwise-text-analysis-result feature to represent the first text token within the first-record text feature subset; and
(c) generating a second pairwise-text-analysis-result feature to represent the first text token within the first-record text feature subset, wherein the second pairwise-text-analysis-result feature is based at least in part on respective similarity scores of a vector representation of the first text token and vector representations of one or more text tokens of the second entity record;
generate a respective image feature set corresponding to individual pairs of the plurality of pairs, wherein an image feature set corresponding to the first pair of the plurality of pairs comprises a first-record image feature subset corresponding to the first entity record and a second-record image feature subset corresponding to the second entity record, wherein the first-record image feature subset is based at least in part on a combination of (a) an embedding of the first image attribute of the first entity record and (b) one or more perceptual hash values corresponding to the first image attribute;
train a machine learning model using a training data set which comprises the respective text feature sets and the respective image feature sets, wherein the machine learning model generates respective similarity scores corresponding to respective pairs of entity records, and wherein the machine learning model comprises:
(a) a text sub-model comprising a convolutional sub-network with a plurality of filters including a first filter with a first filter size corresponding to a first number of successive text tokens, and a second filter with a second filter size corresponding to a second number of successive text tokens, and wherein the text sub-model comprises a hierarchical neural sub-network with one or more skip connections;
(b) an image sub-model in which one or more computations are performed on differences between respective image features of entity records of a pair of entity records; and
(c) a multi-modal similarity score predictor whose input comprises learned text representations generated by the text sub-model and learned image representations generated by the image sub-model; and
transmit a similarity score, generated by a trained version of the machine learning model with respect to a particular pair of entity records, to one or more destinations.

2. The system as recited in claim 1, wherein the one or more computing devices include further instructions that upon execution on or across the one or more computing devices further cause the one or more computing devices to:
obtain a model training request via one or more programmatic interfaces of a network-accessible service, wherein training of the machine learning model is initiated in response to the model training request.

3. The system as recited in claim 1, wherein the one or more computing devices include further instructions that upon execution on or across the one or more computing devices further cause the one or more computing devices to:
cause at least a portion of content of a web site to be modified based at least in part on the similarity score generated by the trained version of the machine learning model with respect to the particular pair of entity records.

4. The system as recited in claim 1, wherein the one or more computing devices include further instructions that upon execution on or across the one or more computing devices further cause the one or more computing devices to:
obtain, via one or more programmatic interfaces, an indication of one or more features to be included in or more of (a) a text feature set or (b) an image feature set.

5. The system as recited in claim 1, wherein a first entity record of the particular pair of entity records has a first schema, and wherein a second entity record of the particular pair has a second schema which differs from the first schema in at least one attribute.

6. A computer-implemented method, comprising:
generating a respective text feature set corresponding to individual pairs of a plurality of pairs of entity records, wherein a text feature set for a first pair of the plurality of pairs comprises a first-record text feature subset corresponding to a first entity record of the first pair and a second-record text feature subset corresponding to a second entity record of the first pair, wherein generating the first-record text feature subset comprises:
(a) analyzing one or more text attributes of the second entity record for presence of at least a portion of a first text token of the first entity record; and
(b) generating, based at least in part on a result of said analyzing, a first pairwise-text-analysis-result feature to represent the first text token within the first-record text feature subset;
generating a respective non-text feature set corresponding to individual pairs of the plurality of pairs, wherein a non-text feature set corresponding to the first pair of the plurality of pairs comprises a first-record non-text feature subset corresponding to the first entity record and a second-record non-text feature subset corresponding to the second entity record, wherein the first-record non-text feature subset is based at least in part on one or more perceptual hash values corresponding to a first non-text attribute of the first entity record;
training a machine learning model using a training data set which comprises the respective text feature sets and the respective non-text feature sets, wherein the machine learning model generates respective similarity scores corresponding to respective pairs of entity records, and wherein the machine learning model comprises: (a) a text sub-model, (b) a non-text sub-model and (c) a multi-modal similarity score predictor whose input comprises learned text representations generated by the text sub-model and learned non-text representations generated by the non-text sub-model; and
storing a trained version of the machine learning model.

7. The computer-implemented method as recited in claim 6, wherein said generating the first pairwise-text-analysis-result feature comprises:
generating an initial value representing the first text token; and
in response to determining that at least the portion of the first text token is not present within the one or more text attributes of the second entity record, determining a modification function to be applied to the initial value, wherein the first pairwise-text-analysis-result feature is based at least in part on a result of applying the modification function to the initial value.

8. The computer-implemented method as recited in claim 6, wherein said generating the first pairwise-text-analysis-result feature comprises:
generating, using an embedding tool, a respective vector representation of (a) the first text token and (b) one or more text tokens of the second entity record;
determining respective similarity metrics between (a) a vector representation of the first text token and (b) vector representations of the one or more text tokens of the second entity record; and
including, within the first pairwise-text-analysis-result feature set, a second pairwise-text-analysis result feature which is based at least in part on the respective similarity metrics.

9. The computer-implemented method as recited in claim 6, further comprising:
obtaining, via one or more programmatic interfaces, an indication of a content analysis mode in which similarity analysis is to be performed with respect to a particular pair of entity records using a trained version of the machine learning model, wherein the content analysis mode is selected from a set comprising (a) a text-only mode, (b) a non-text-only mode and (c) a multi-modal mode;
determining respective values of one or more configuration settings of the trained version of the model in accordance with the content analysis mode, wherein the one or more configuration settings control disabling of the text sub-model and the non-text sub-model; and
obtaining a similarity score for the particular pair of entity records from the trained version of the model after the respective values of the one or more configuration settings have been determined.

10. The computer-implemented method as recited in claim 6, wherein the text sub-model comprises (a) a token-level layer and (b) an attribute-level layer, wherein input of the token-level layer comprises respective sets of features representing individual text tokens, wherein output of the token-level layer comprises learned vector representations of the individual text tokens, wherein input of the attribute-level layer comprises output of the token-level layer corresponding to one or more tokens of a text attribute, and wherein output of the attribute-level layer comprises a learned vector representation of a text attribute.

11. The computer-implemented method as recited in claim 6, wherein the text sub-model comprises a mirrored neural network, comprising a first mirror which generates a learned representation of one or more text attributes of a first record of a particular pair of entity records, and a second mirror which generates a learned representation of one or more text attributes of a second record of the particular pair of entity records.

12. The computer-implemented method as recited in claim 6, wherein the text sub-model comprises a first convolutional neural sub-network with a plurality of filters including a first filter with a first filter size corresponding to a first number of successive text tokens, and a second filter with a second filter size corresponding to a second number of successive text tokens.

13. The computer-implemented method as recited in claim 6, wherein the text sub-model comprises a first hierarchical convolutional neural sub-network with a plurality of layers arranged in sequence, wherein individual layers of the plurality of layers comprise a first layer with a first filter size and a second layer with the first filter size, wherein output of the first layer is provided as input to the second layer.

14. The computer-implemented method as recited in claim 6, wherein the text sub-model comprises one or more neural sub-networks with respective skip connections which bypass one or more layers of a hierarchy of layers of the one or more neural sub-networks.

15. The computer-implemented method as recited in claim 6, wherein the text sub-model comprises at least one neural sub-network with (a) global maximum pooling and (b) global average pooling.

16. One or more non-transitory computer-accessible storage media storing program instructions that when executed on or across one or more processors cause the one or more processors to:
   generate a respective text feature set corresponding to individual pairs of a plurality of pairs of entity records, wherein a text feature set for a first pair of the plurality of pairs comprises a first-record text feature subset corresponding to a first entity record of the first pair and a second-record text feature subset corresponding to a second entity record of the first pair, wherein generating the first-record text feature subset comprises:
      (a) analyzing one or more text attributes of the second entity record for presence of at least a portion of a first text token of the first entity record; and
      (b) generating, based at least in part on a result of said analyzing, a first pairwise-text-analysis-result feature to represent the first text token within the first-record text feature subset;
   generate a respective non-text feature set corresponding to individual pairs of the plurality of pairs, wherein a non-text feature set corresponding to the first pair of the plurality of pairs comprises a first-record non-text feature subset corresponding to the first entity record and a second-record non-text feature subset corresponding to the second entity record, wherein the first-record non-text feature subset is based at least in part on one or more perceptual hash values corresponding to a first non-text attribute of the first entity record; and
   train a machine learning model using a training data set which comprises the respective text feature sets and the respective non-text feature sets, wherein the machine learning model generates respective relationship scores corresponding to respective pairs of entity records, and wherein the machine learning model comprises: (a) a text sub-model and (b) a non-text sub-model.

17. The one or more non-transitory computer-accessible storage media as recited in claim 16, wherein the machine learning model comprises a multi-modal relationship score predictor whose input comprises learned text representations generated by the text sub-model and learned non-text representations generated by the non-text sub-model.

18. The one or more non-transitory computer-accessible storage media as recited in claim 16, wherein the non-text sub-model comprises a mirrored neural network comprising a first mirror which generates a learned representation of one or more non-text attributes of a first record of a particular pair of entity records, and a second mirror which generates a learned representation of one or more non-text attributes of a second record of the particular pair of entity records.

19. The one or more non-transitory computer-accessible storage media as recited in claim 16, wherein the non-text sub-model comprises one or more layers at which a difference between (a) a vector representation of a first non-text attribute of a first record of a particular pair of entity records and (b) a vector representation of a corresponding non-text attribute of a second record of the particular pair of entity records is computed.

20. The one or more non-transitory computer-accessible storage media as recited in claim 16, wherein the first non-text attribute of the first entity record comprises one or more of: (a) an image, (b) a video, (c) an audio recording, or (d) one or more numeric values.

* * * * *